US009891743B2

(12) United States Patent
Yanagawa

(10) Patent No.: US 9,891,743 B2
(45) Date of Patent: Feb. 13, 2018

(54) DRIVING METHOD OF AN INPUT DEVICE

(71) Applicant: Semiconductor Energy Laboratory Co., Ltd., Atsugi-shi, Kanagawa-ken (JP)

(72) Inventor: Katsuki Yanagawa, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 349 days.

(21) Appl. No.: 14/700,620

(22) Filed: Apr. 30, 2015

(65) Prior Publication Data

US 2015/0317007 A1 Nov. 5, 2015

(30) Foreign Application Priority Data

May 2, 2014 (JP) .................................. 2014-095070

(51) Int. Cl.
| | | |
|---|---|---|
| G06F 3/041 | (2006.01) | |
| G09G 5/00 | (2006.01) | |
| G06F 1/16 | (2006.01) | |
| G09G 3/20 | (2006.01) | |
| A63F 13/214 | (2014.01) | |
| A63F 13/00 | (2014.01) | |
| G06F 3/0483 | (2013.01) | |

(Continued)

(52) U.S. Cl.
CPC .......... *G06F 3/0416* (2013.01); *G06F 1/1626* (2013.01); *G06F 1/1643* (2013.01); *G06F 1/1652* (2013.01); *G06F 3/041* (2013.01); *G09G 3/20* (2013.01); *G09G 5/003* (2013.01); *A63F 13/00* (2013.01); *A63F 13/214* (2014.09); *A63F 13/2145* (2014.09); *G06F 3/0481* (2013.01); *G06F 3/0483* (2013.01); *G06F 2203/04102* (2013.01); *G09G 2300/023* (2013.01); *G09G 2300/0408* (2013.01); *G09G 2300/0426* (2013.01); *G09G 2354/00* (2013.01); *G09G 2380/02* (2013.01)

(58) Field of Classification Search
CPC .......... A63F 13/00; A63F 13/06; A63F 13/08; A63F 13/214; A63F 13/2145; A63F 13/02; A63F 13/215; G06F 3/041; G06F 3/0481; G06F 3/0483; G09G 5/003
USPC ...................... 463/36, 37; 345/156, 173, 174
See application file for complete search history.

(56) References Cited

U.S. PATENT DOCUMENTS 7,309,287 B2  12/2007  Miyamoto et al.
7,578,742 B2   8/2009  Miyamoto et al.
(Continued)

FOREIGN PATENT DOCUMENTS

JP   2005-192986 A   7/2005

*Primary Examiner* — William H McCulloch, Jr.
*Assistant Examiner* — Chase Leichliter
(74) *Attorney, Agent, or Firm* — Fish & Richardson P.C.

(57) ABSTRACT

An input device making little false sensing is provided. An input device capable of outputting a signal in which input data in a plurality of regions are combined is provided. The input device includes a first region and a second region which are provided so as to face each other. The input device includes a means for obtaining first positional data input to the first region, a means for obtaining second positional data input to the second region, a means for converting the second positional data into third positional data, a means for obtaining fourth positional data, and a means for outputting a signal in accordance with the fourth positional data.

8 Claims, 16 Drawing Sheets

(51) Int. Cl.
 *G06F 3/0481* (2013.01)
 *A63F 13/2145* (2014.01)

(56) References Cited

U.S. PATENT DOCUMENTS

| | | | | |
|---|---|---|---|---|
| 8,698,764 | B1* | 4/2014 | Karakotsios | G06F 1/1692 |
| | | | | 345/173 |
| 8,810,524 | B1* | 8/2014 | Rosenberg | G06F 1/1643 |
| | | | | 345/1.1 |
| 9,317,197 | B2* | 4/2016 | Takuma | G06F 3/0488 |
| 9,519,419 | B2* | 12/2016 | Hinckley | G06F 1/1684 |
| 2007/0291008 | A1* | 12/2007 | Wigdor | G06F 1/1613 |
| | | | | 345/173 |
| 2010/0013777 | A1* | 1/2010 | Baudisch | G06F 1/1626 |
| | | | | 345/173 |
| 2010/0194705 | A1* | 8/2010 | Kim | G06F 1/1626 |
| | | | | 345/173 |
| 2011/0094098 | A1* | 4/2011 | Hamblin | G06F 3/0416 |
| | | | | 29/846 |
| 2011/0096009 | A1 | 4/2011 | Kurokawa et al. | |
| 2011/0109592 | A1 | 5/2011 | Kurokawa et al. | |
| 2011/0163986 | A1* | 7/2011 | Lee | G06F 1/1692 |
| | | | | 345/173 |
| 2011/0310062 | A1 | 12/2011 | Ikeda et al. | |
| 2012/0188185 | A1* | 7/2012 | Cassar | G06F 1/1616 |
| | | | | 345/173 |
| 2013/0009909 | A1 | 1/2013 | Yamazaki et al. | |
| 2013/0057487 | A1* | 3/2013 | Yamanaka | G06F 1/1626 |
| | | | | 345/173 |
| 2013/0141373 | A1* | 6/2013 | Takuma | G06F 3/04883 |
| | | | | 345/173 |
| 2013/0181902 | A1* | 7/2013 | Hinckley | G06F 1/1684 |
| | | | | 345/168 |
| 2013/0278624 | A1* | 10/2013 | Abe | G09G 5/363 |
| | | | | 345/619 |
| 2013/0321366 | A1 | 12/2013 | Kozuma et al. | |
| 2014/0191980 | A1* | 7/2014 | Mulabagal | G06F 3/0481 |
| | | | | 345/173 |
| 2014/0240362 | A1 | 8/2014 | Kurita | |
| 2015/0009128 | A1 | 1/2015 | Matsumoto | |
| 2015/0135145 | A1* | 5/2015 | Kamide | G06F 3/0488 |
| | | | | 715/863 |
| 2015/0293695 | A1* | 10/2015 | Schonleben | G06F 3/04886 |
| | | | | 345/173 |

* cited by examiner

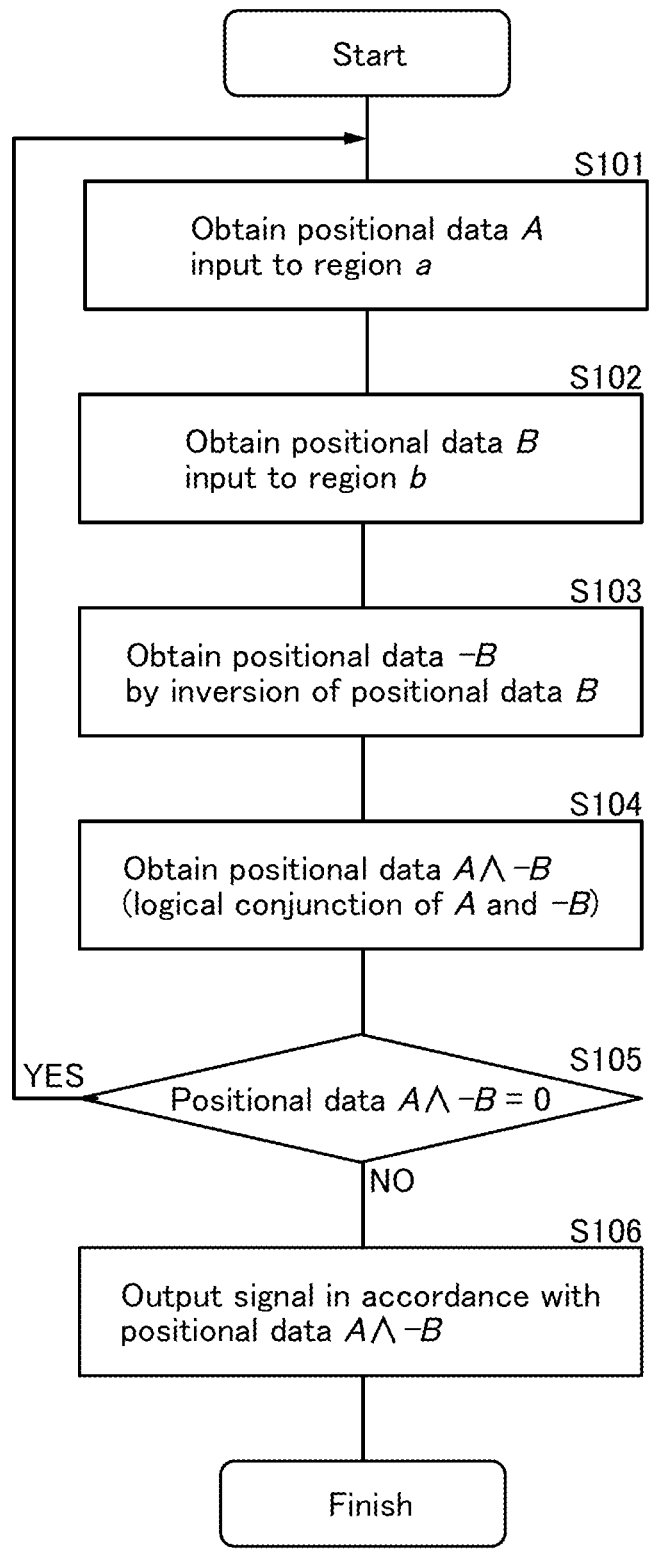

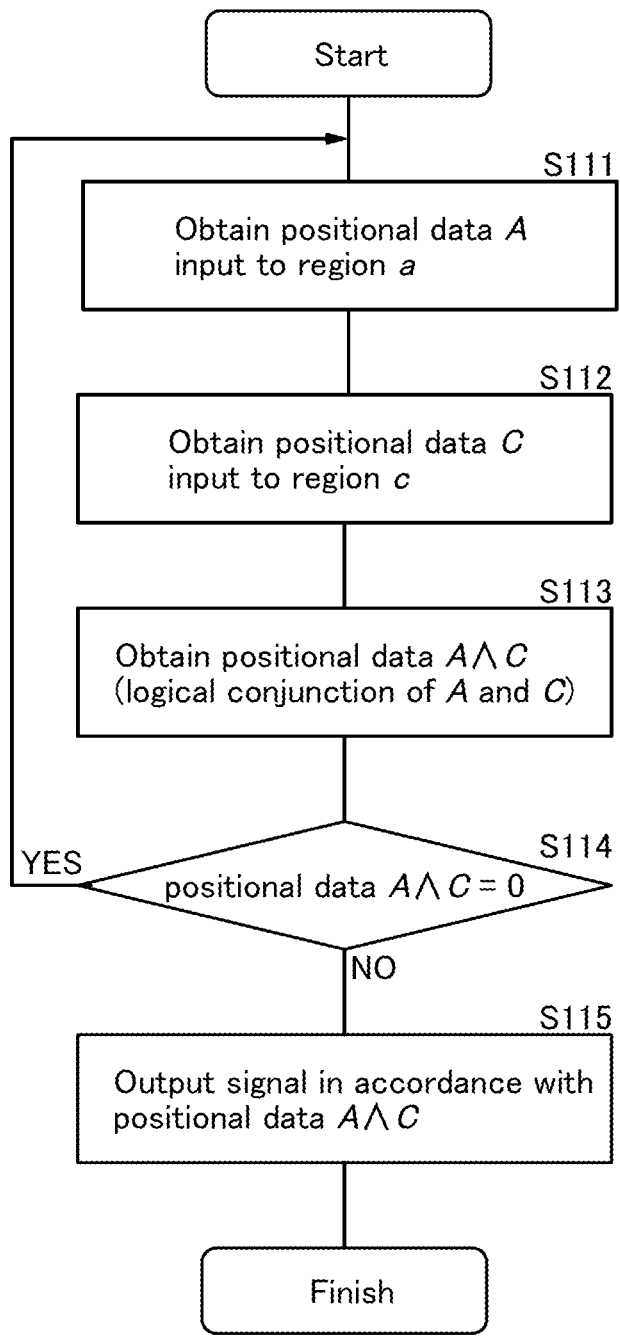

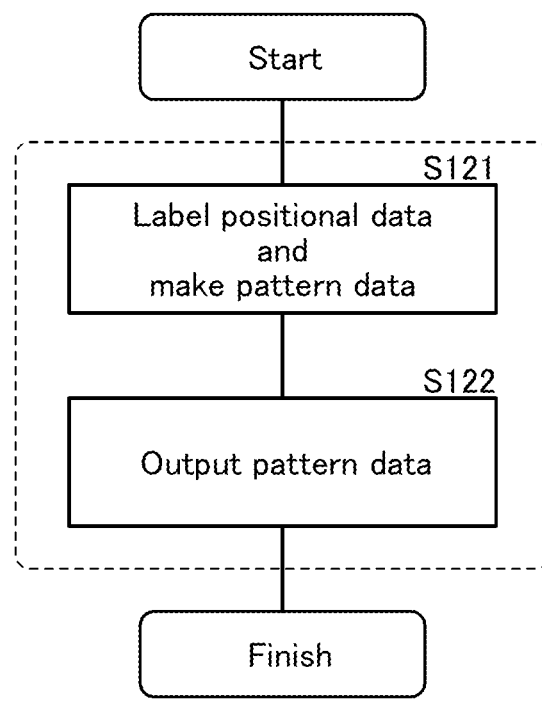

FIG. 4A
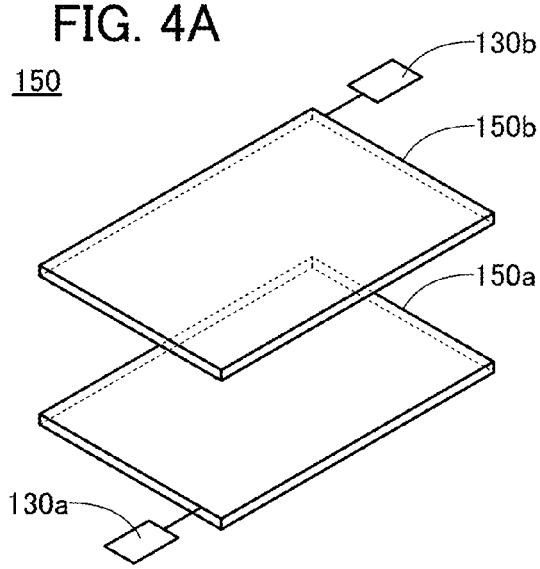
FIG. 4B
FIG. 4C
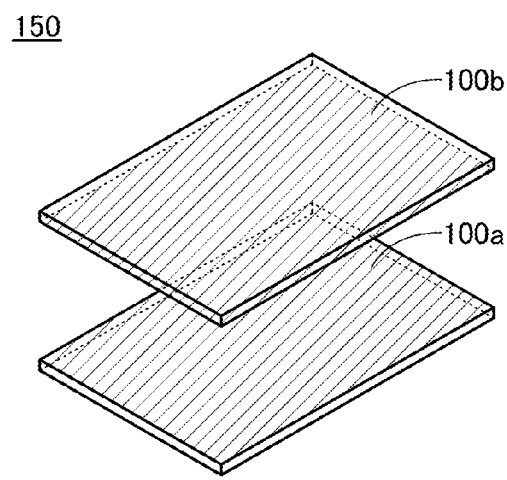
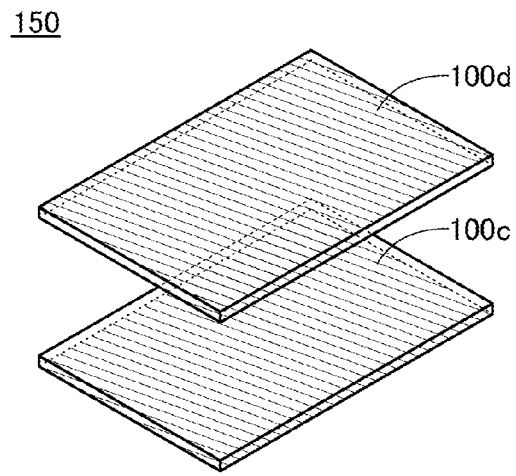

150

100a

100c

150

150

150

150

200

200

DRIVING METHOD OF AN INPUT DEVICE

BACKGROUND OF THE INVENTION

1. Field of the Invention

The present invention relates to, for example, an input device, a module, a game machine, and an electronic device, and a manufacturing method thereof. Further, the present invention relates to, for example, a semiconductor device, a display device, a light-emitting device, a lighting device, a power storage device, a memory device, or a processor. Furthermore, the present invention relates to a method for manufacturing a semiconductor device, a display device, a liquid crystal display device, a light-emitting device, or a memory device. Still furthermore, the present invention relates to a driving method of an input device, a module, a semiconductor device, a display device, a liquid crystal display device, a light-emitting device, a memory device, a game machine, and an electronic device.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter.

Note that an input device in this specification and the like refers to any device having a function of inputting data. In the case of an input device having a function of outputting input data, the input device can also be called an input/output device. For example, a touch panel (including an on-cell touch panel, an in-cell touch panel, and the like), a touch sensor, a contactless sensor, a gesture sensor, an acceleration sensor, a photosensor, a sound sensor, a temperature sensor, or the like includes an input device in some cases. Further, in this specification and the like, the term "semiconductor device" means all devices which can operate by utilizing semiconductor characteristics. A display device, a light-emitting device, a lighting device, an electro-optical device, a semiconductor circuit, and an electronic device include a semiconductor device in some cases.

2. Description of the Related Art

In recent years, products such as portable information terminals or game machines which are mounted with touch sensors or the like have been increased (see Patent Document 1). Note that a touch sensor can have high sensing accuracy in a minute region by including a larger number of sensors per area. Further, unique products have been manufactured, for example, by utilizing an entire surface as a detection region.

On the other hand, unlike the case of using a button, a touch sensor makes false sensing by unintentional contact or the like in some cases.

REFERENCE

Patent Document

[Patent Document 1] Japanese Published Patent Application No. 2005-192986

SUMMARY OF THE INVENTION

An object of one embodiment of the present invention is to provide an input device making little false sensing. Another object of one embodiment of the present invention is to provide an input device capable of outputting a signal in which input data in a plurality of regions are combined. Another object is to provide a novel input device. Another object is to provide a module including the input device. Another object is to provide a game machine including the input device or the module. Another object is to provide an electronic device including the input device or the module. Another object is to provide a novel module. Another object is to provide a novel game machine. Another object is to provide a novel electronic device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

(1) One embodiment of the present invention is an input device including a first region and a second region which are provided so as to face each other. The input device includes a means for obtaining first positional data input to the first region; a means for obtaining second positional data input to the second region; a means for converting the second positional data into third positional data; a means for obtaining fourth positional data; and a means for outputting a signal in accordance with the fourth positional data. The third positional data includes data in which the second positional data is inverted vertically or horizontally. The fourth positional data includes data which is logical conjunction of the first positional data and the third positional data.

(2) Another embodiment of the present invention is an input device including a first region and a second region which are placed back to back. The input device includes a means for obtaining first positional data input to the first region; a means for obtaining second positional data input to the second region; a means for obtaining third positional data; and a means for outputting a signal in accordance with the third positional data. The third positional data includes data which is logical conjunction of the first positional data and the second positional data.

(3) Another embodiment of the present invention is an input device including a first region and a second region which are placed back to back. The input device includes a means for obtaining first positional data input to the first region; a means for obtaining second positional data input to the second region; a means for converting the second positional data into third positional data; a means for obtaining fourth positional data; and a means for outputting a signal in accordance with the fourth positional data. The third positional data includes data in which the second positional data is inverted vertically or horizontally. The fourth positional data includes data which is logical conjunction of the first positional data and the third positional data.

(4) Another embodiment of the present invention is an input device according to any one of (1) to (3), in which the signal includes labeled pattern data.

(5) Another embodiment of the present invention is an input device according to any one of (1) to (4), having a function of sensing contact of an object.

(6) Another embodiment of the present invention is an input device according to any one of (1) to (5), including a flexible region.

(7) Another embodiment of the present invention is a module including the input device according to any one of (1) to (6) and a display device.

(8) Another embodiment of the present invention is an operating device including either the input device according to any one of (1) to (6) or the module according to (7), and a transmitting portion.

(9) Another embodiment of the present invention is a game machine including either the input device according to any one of (1) to (6), the module according to (7), or the operating device according to (8), and a processor.

(10) Another embodiment of the present invention is an electronic device including the input device according to any one of (1) to (6), the module according to (7), or the operating device according to (8) and a speaker, an operation key, or a battery.

It is possible to provide an input device making little false sensing. It is possible to provide an input device capable of outputting a signal in which input data in a plurality of regions are combined. It is possible to provide a novel input device. It is possible to provide a module including the input device. It is possible to provide a game machine including the input device or the module. It is possible to provide an electronic device including the input device or the module. It is possible to provide a novel module. It is possible to provide a novel game machine. It is possible to provide a novel electronic device.

Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

In the accompanying drawings:

FIG. 1 is a flow chart of operation of an input device;
FIG. 2 is a flow chart of operation of an input device;
FIG. 3 is a flow chart of operation of an input device;
FIGS. 4A to 4C are perspective views illustrating an input device.

DETAILED DESCRIPTION OF THE INVENTION

Figure 5A:
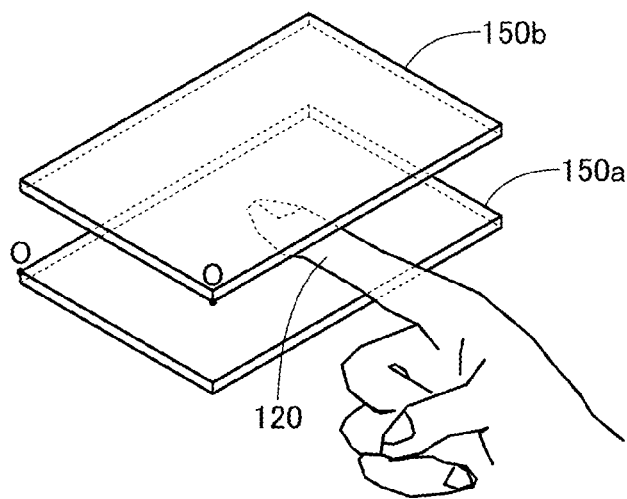
FIG. 5A is a perspective view illustrating operation of an input device and FIGS. 5B to 5D are plan views illustrating the same.

An embodiment of the present invention will be described in detail with reference to the drawings. However, the present invention is not limited to the description below, and it is easily understood by those skilled in the art that modes and details disclosed herein can be modified in various ways. Further, the present invention is not construed as being limited to description of the embodiment. In describing structures of the present invention with reference to the drawings, common reference numerals are used for the same portions in different drawings. Note that the same hatched pattern is applied to similar parts, and the similar parts are not especially denoted by reference numerals in some cases.

Note that the size, the thickness of films (layers), or regions in drawings is sometimes exaggerated for simplicity.

Note that the ordinal numbers such as "first" and "second" in this specification are used for convenience and do not denote the order of steps or the stacking order of layers. Therefore, for example, the term "first" can be replaced with the term "second", "third", or the like as appropriate. In addition, the ordinal numbers in this specification and the like do not correspond to the ordinal numbers which specify one embodiment of the present invention in some cases.

Note that in this specification, the description "A has a shape such that an end portion extends beyond an end portion of B" may indicate, for example, the case where at least one of end portions of A is positioned on an outer side than at least one of end portions of B in a top view or a cross-sectional view. Thus, the description "A has a shape such that an end portion extends beyond an end portion of B" can be alternately referred to as the description "one of end portions of A is positioned on an outer side than one of end portions of B", for example in a top view.

<Operation of Input Device>

The following shows operation of an input device of one embodiment of the present invention.

FIG. 1 is a flow chart showing steps up to and including steps of converting and outputting positional data input to the input device of one embodiment of the present invention. The input device includes a region a and a region b which can sense the positional data.

First, positional data A input to the region a is obtained (see Step S101). Note that positional data includes X-coordinate positional data (horizontal positional data) and Y-coordinate positional data (vertical positional data) in this specification. Further, in this specification, positional data includes a plurality of coordinates in some cases. For example, input positional data straddling over a plurality of coordinates may be regarded as one positional data. Furthermore, positional data which are input separately to a plurality of coordinates may be regarded as one positional data or a plurality of positional data.

Next, positional data −B input to the region b is obtained (see Step S102). Note that the region a and the region b have different regions. Note that the x-coordinate and the y-coordinate of the region a with respect to the origin and the x-coordinate and the y-coordinate of the region b with respect to the origin can be compared.

Next, positional data −B is obtained by inversion of the positional data B (see Step S103). Note that "inversion of positional data" means inverting positional data horizontally and/or vertically with respect to the center of the region.

Next, the positional data A and the positional data −B are compared, and positional data A∧−B which is logical conjunction of the positional data A and the positional data −B is obtained (see Step S104). In other words, coordinates where the positional data A and the positional data −B overlap with each other are extracted and regarded as new positional data.

Next, whether the value of the positional data A∧−B is zero or not is determined (see Step S105). When the positional data A∧−B is zero, the operation returns to Step S101. When the value of the positional data A∧−B is not zero, a signal in accordance with the positional data A∧−B is output (see Step S106). Note that "the value of the positional data A∧−B is zero" means that the positional data A and the positional data −B do not have the same coordinates.

Note that the signal in accordance with the positional data A∧−B may be output as one or a plurality of coordinates or as labeled pattern data. For example, as shown in FIG. 3, Step S106 may be performed through Step S121 of labeling positional data and making pattern data and Step S122 of outputting the pattern data.

Further, FIG. 2 shows a flow chart different from that in FIG. 1, in which positional data input to the input device of one embodiment of the present invention is converted and output. The input device includes the region a and a region c which can sense positional data.

First, the positional data A input to the region a is obtained (see Step S111).

Next, positional data C input to the region c is obtained (see Step S112). Note that the region a and the region c have different regions. Note that the x-coordinate or the y-coordinate of the region a with respect to the origin and the x-coordinate or the y-coordinate of the region c with respect to the origin can be compared.

Next, the positional data A and the positional data C are compared, and positional data A∧C which is logical conjunction of the positional data A and the positional data C is obtained (see Step S113).

Next, whether the value of the positional data A∧C is zero or not is determined (see Step S114). When the value of the positional data A∧C is zero, the operation returns to Step S111. When the positional data A∧C is not zero, a signal in accordance with the positional data A∧C is output (see Step S115).

FIG. 1 and FIG. 2 are different from each other only in whether one of the positional data is inverted or not. Accordingly, as for the flow chart shown in FIG. 2, the description of FIG. 1 can be referred to.

Thus, the positional data input to the input device of one embodiment of the present invention can be converted and output.

<Example of Input Device>

Next, an example of an input device of one embodiment of the present invention is described.

FIG. 4A is a perspective view of an input device 150 including an input portion 150a and an input portion 150b. In the input device 150, the input portion 150a and the input portion 150b are provided so as to face each other. Note that as illustrated in FIG. 4B, the input portion 150a includes a region 100a on its surface facing the inner side of the input device 150. Further, the input portion 150b includes a region 100b on its surface facing the inner side of the input device 150. As illustrated in FIG. 4C, the input portion 150a includes a region 100c on its surface facing the outer side of the input device 150. Further, the input portion 150b includes a region 100d on its surface facing the outer side of the input device 150. Note that a circuit 130a which controls a sensor or the like may be connected to the input portion 150a. Further, a circuit 130b which controls a sensor or the like may be connected to the input portion 150b.

For example, as illustrated in FIG. 5A, in the input device 150, with the use of the input portion 150a and the input portion 150b, false sensing can be reduced. Here, a method for sensing positional data of an object 120 provided between the input portion 150a and the input portion 150b is described.

Figure 5B:
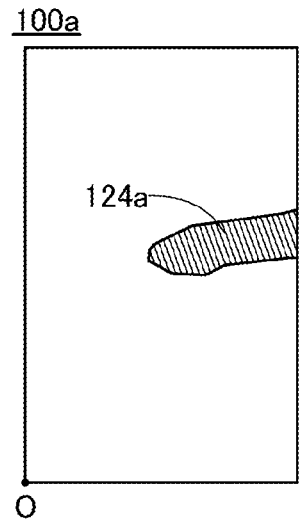

The region 100a of the input portion 150a obtains positional data 124a corresponding to the shape of the object 120 (see FIG. 5B). This corresponds to Step S101 in FIG. 1. Similarly, the region 100b of the input portion 150b obtains positional data 124b corresponding to the shape of the object 120 (see FIG. 5C). This corresponds to Step S102 in FIG. 1.

Figure 5C:
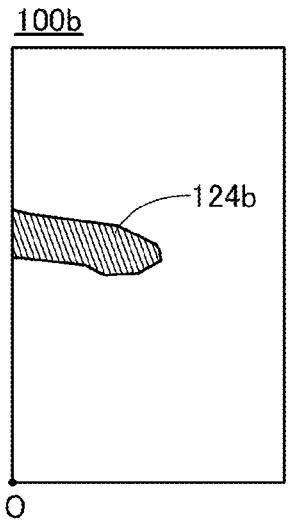

Next, logical conjunction of the positional data 124a and the positional data 124b may be obtained. Note that as illustrated in FIG. 5C, depending on a method for obtaining the origin (denoted by O in the figure) and coordinates, the left and the right of the positional data 124b are reverse to those of the positional data 124a like a mirror in some cases. In this case, conversion into positional data which can be compared by mirror-inverting the positional data is preferable. This corresponds to Step S103 in FIG. 1.

Figure 5D:
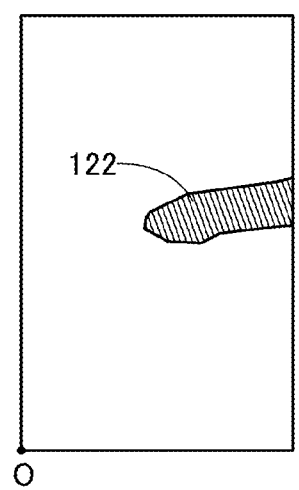

FIG. 5D illustrates positional data 122 which is logical conjunction of the positional data 124a and the mirror-inverted positional data 124b. This corresponds to Step S104 in FIG. 1.

Next, it is confirmed whether the value of the positional data 122 is not zero. This corresponds to Step S105 in FIG. 1.

Then, a signal in accordance with the positional data 122 is output. This corresponds to Step S106 in FIG. 1.

In this manner, comparative verification is performed on two kinds of positional data to obtain one positional data, whereby false sensing of the input device can be reduced.

Figure 6A:
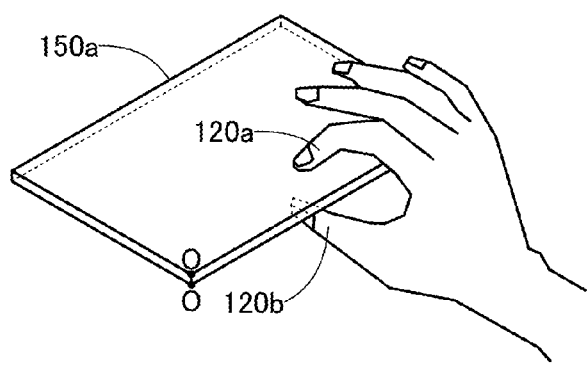
FIG. 6A is a perspective view illustrating operation of an input device and FIGS. 6B to 6D are plan views illustrating the same.

Alternatively, as illustrated in FIG. 6A, for example, false sensing can be reduced with the use of only the input portion 150a in the input device 150. Here, a method for sensing positional data of a region interposed between an object 120a and an object 120b is described.

Figure 6B:
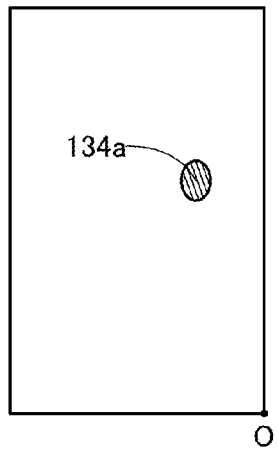
Figure 6C:
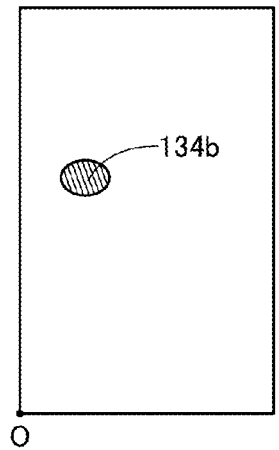

The region 100a of the input portion 150a obtains positional data 134a corresponding to the shape of the object 120a (see FIG. 6B). This corresponds to Step S111 in FIG. 2. Similarly, the region 100c of the input portion 150a obtains positional data 134b corresponding to the shape of the object 120b (see FIG. 6C). This corresponds to Step S112 in FIG. 2.

Figure 6D:
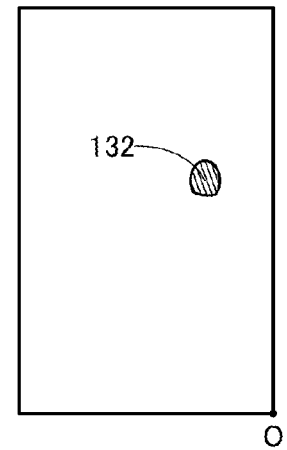

FIG. 6D illustrates positional data 132 which is logical conjunction of the positional data 134a and the positional data 134b. This corresponds to Step S113 in FIG. 2.

Next, it is confirmed whether the value of the positional data 132 is not zero. This corresponds to Step S114 in FIG. 2.

Then, a signal in accordance with the positional data 132 is output. This corresponds to Step S115 in FIG. 2.

In this manner, comparative verification is performed on two kinds of positional data to obtain one positional data, whereby false sensing of the input device can be reduced.

Although description is not made here, the region 100d of the input portion 150b may be used.

Figure 7A:
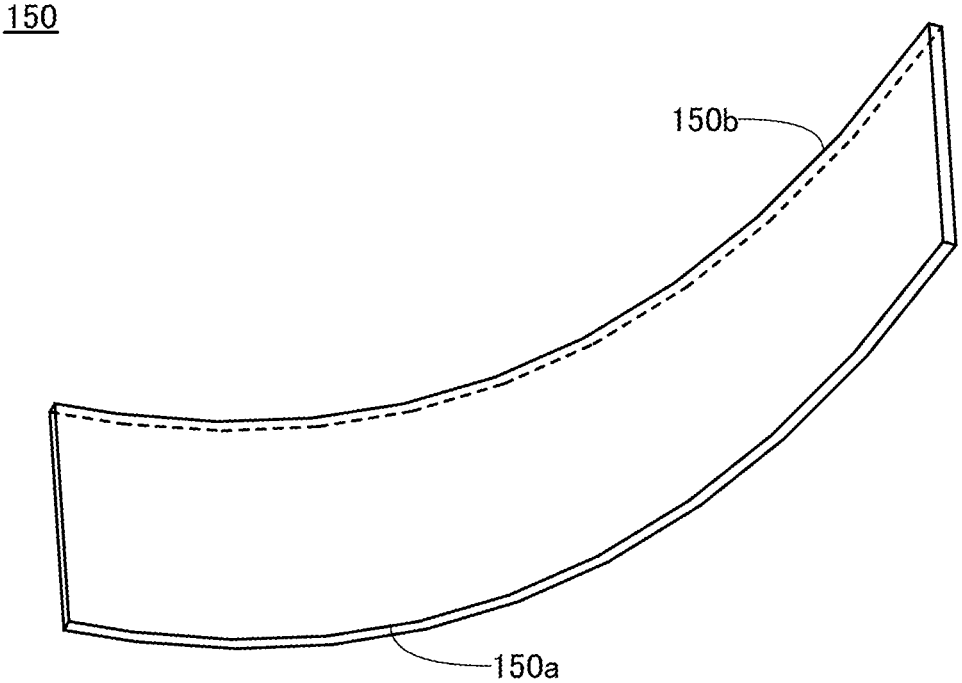
FIGS. 7A and 7B are perspective views illustrating an input device.
Figure 7B:
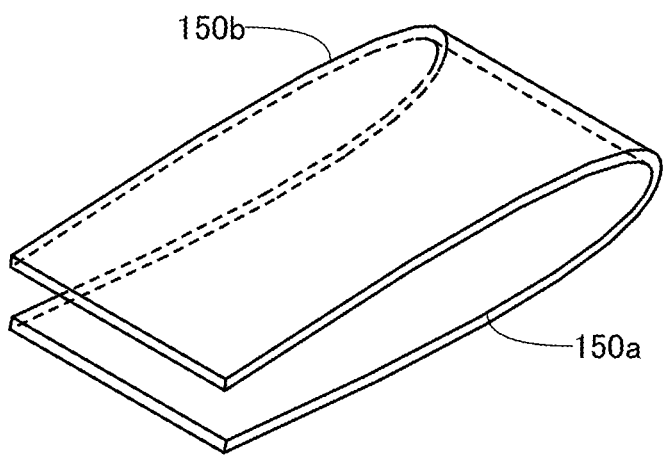

Note that the input portion 150a and the input portion 150b of the input device 150 may be combined. For example, as illustrated in FIG. 7A, part of the flexible input device 150 may serve as the input portion 150a, and another part of the flexible input device 150 may serve as the input portion 150b. In this case, when the input device 150 is folded as illustrated in FIG. 7B, the region 100a of the input portion 150a and the region 100b of the input portion 150b face each other as illustrated in FIG. 4B or the like. The flexibility of the input device 150 enables a variety of designs of the input device 150. Further, the lightweight and durable input device 150 can be achieved. Note that even when the input device 150 is folded, a folded portion is not clear in some cases. For example, the case where the folded portion smoothly changes can also be called the state where it is folded.

Further, in some cases, for example, when the input device 150 is in an unfolded state as illustrated in FIG. 7A, there is no need to distinguish the input portion 150a and the input portion 150b from each other. Furthermore, in some cases, for example, when the input device 150 is folded as illustrated in FIG. 7B, the input device 150 may have a function of sensing a folded position and distinguishing the input portion 150a and the input portion 150b from each other depending on the folded position.

Figure 8A:
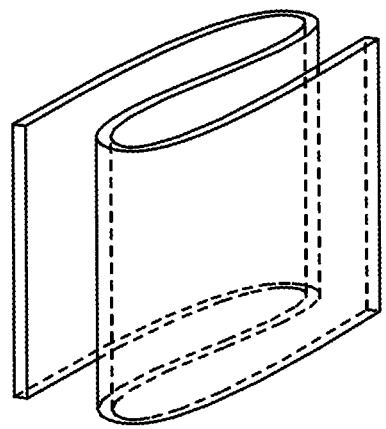
FIGS. 8A and 8B are perspective views each illustrating an input device.
Figure 8B:
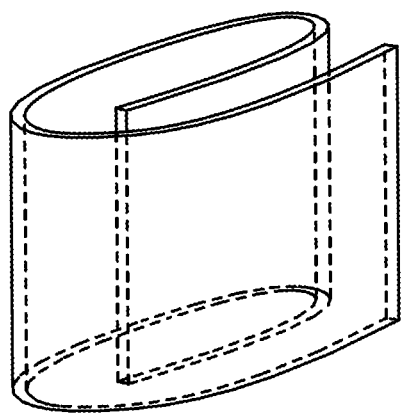

Similarly, as illustrated in FIG. 8A, the input device 150 may have one mountain fold and one valley fold. Further, as illustrated in FIG. 8B, the input device 150 may have two mountain folds. Furthermore, although not illustrated, the input device 150 may have more folds. The input device 150 may include more input portions similar to the input portion 150a and the input portion 150b by increasing the number of folds.

<Display Device>

Figure 9A:
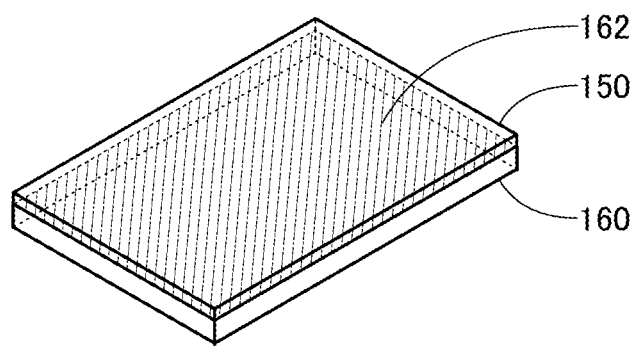
FIGS. 9A and 9B are perspective views each illustrating a panel including an input device.
Figure 9B:
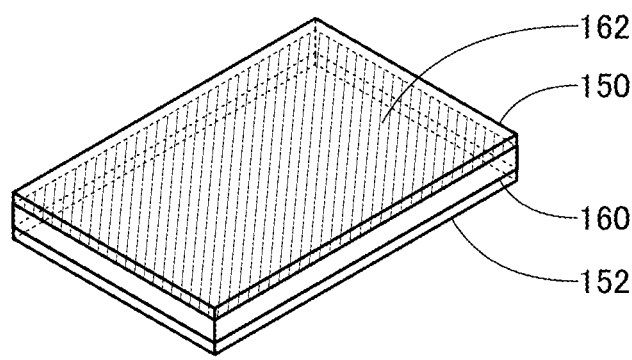

FIGS. 9A and 9B illustrate examples of modules each including a display device and the above-described input device.

FIG. 9A is a perspective view of a module 200 including a display device 160 and the input device 150. The display device 160 includes a display region 162 on its upper surface. The input device 150 is provided on the display region 162 side. Note that the input device 150 may be provided on the side opposite to the display region 162 side in some cases.

FIG. 9B is a perspective view of the module 200 including the display device 160, the input device 150, and an input device 152. The display device 160 includes the display region 162 on its upper surface. The input device 150 is provided on the display region 162 side. Further, the input device 152 is provided on the side opposite to the display region 162 side. Note that for the input device 152, refer to the description of the input device 150. Further, the input device 150 and the input device 152 may be regarded as one input device. Furthermore, the input device 150 and the input device 152 may be integrated.

Note that the module 200 may include a flexible region. The flexible region of the module 200 enables a variety of designs of the module 200. Further, the lightweight and durable module 200 can be achieved.

The module 200 can use a signal output from the input device 150 in accordance with a content displayed on the display region 162. Therefore, the module 200 is suitable for a variety of applications.

⟨Touch Panel 1⟩

A structure of a touch panel of one embodiment of the present invention is described below with reference to FIGS. 12A and 12B and FIGS. 13A to 13C. Although the description is made on a touch sensor below, the following description may be applied to a non-contact sensor.

Figure 12A:
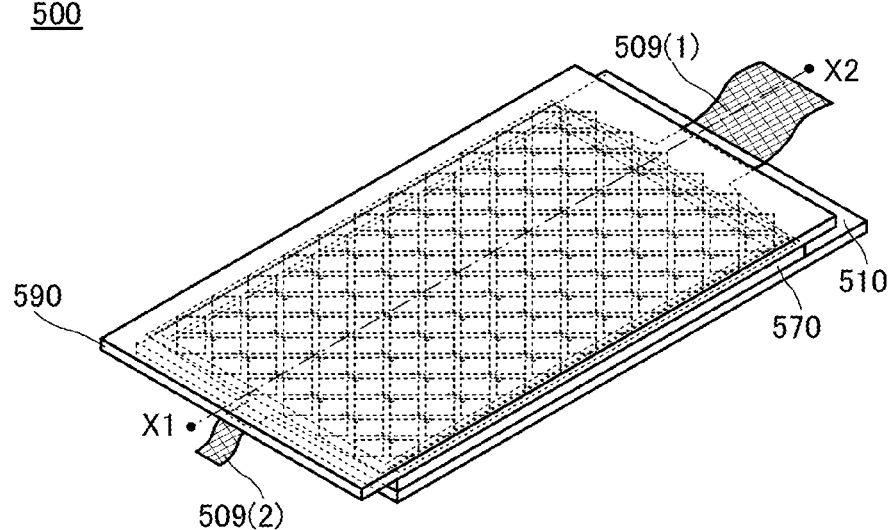
FIGS. 12A and 12B are views illustrating a touch panel.
Figure 12B:
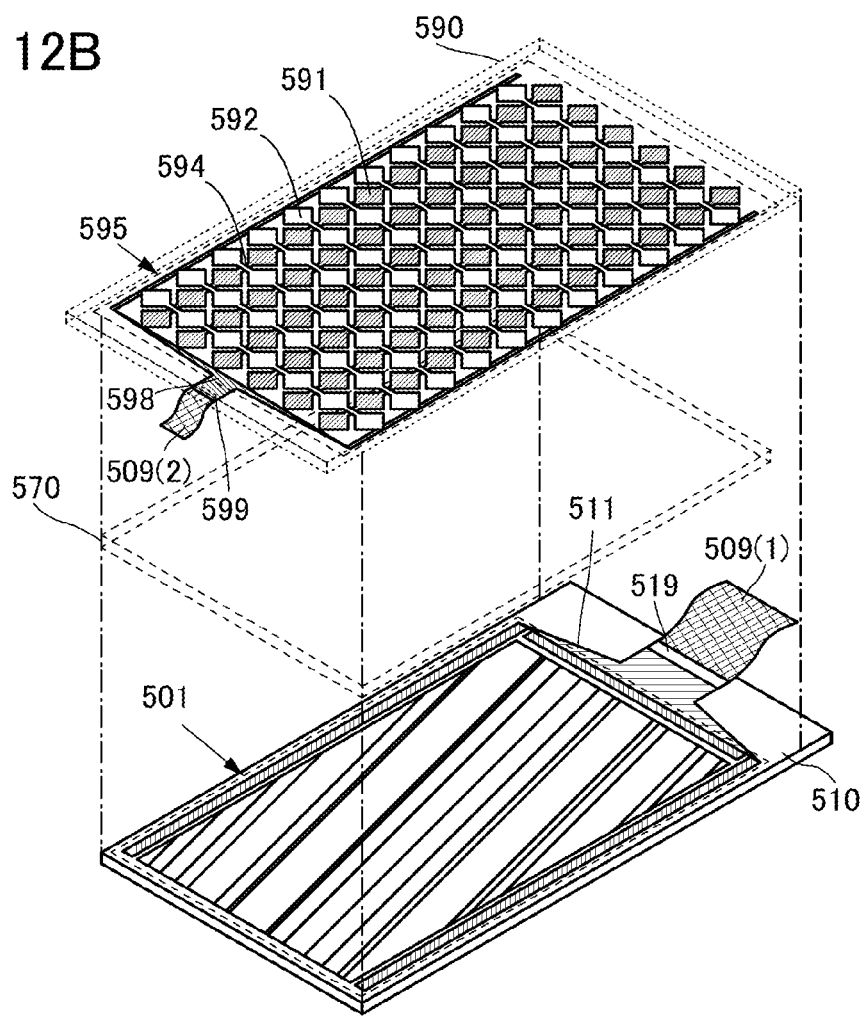

FIG. 12A is a perspective view of a touch panel 500 exemplified in this embodiment. For simplicity, only main components are illustrated, and some components are not illustrated. FIG. 12B is a perspective view of the touch panel 500.

Figure 13A:
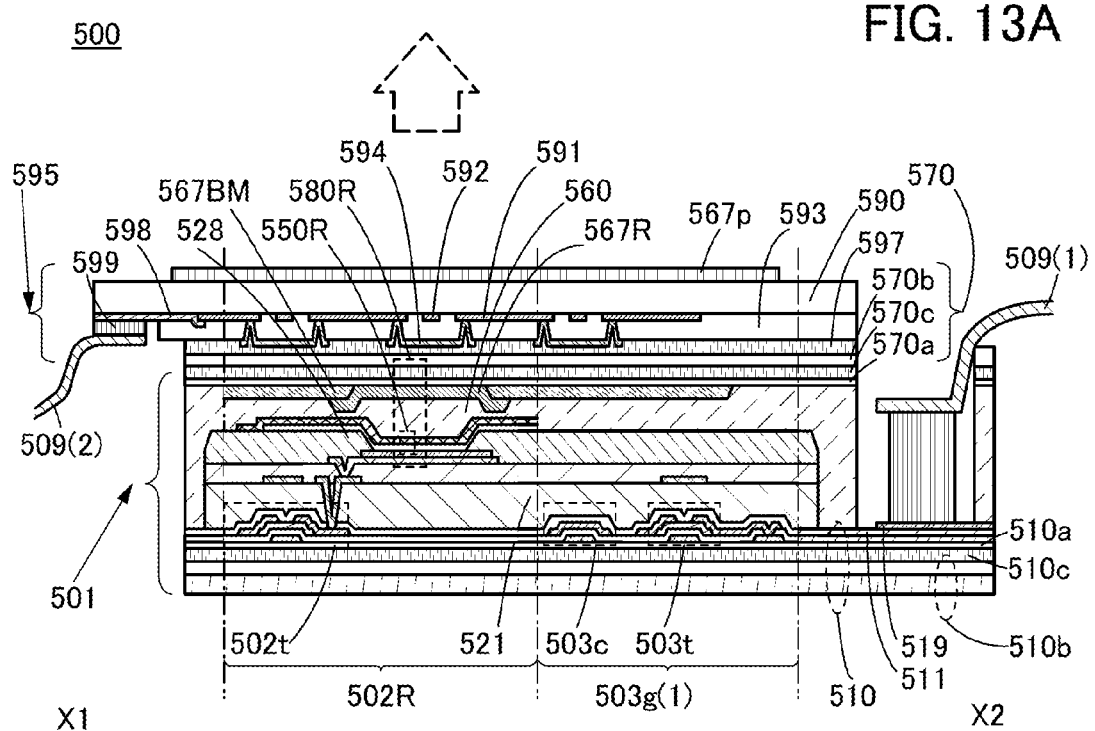
FIGS. 13A to 13C are views illustrating a touch panel.
Figure 13B:
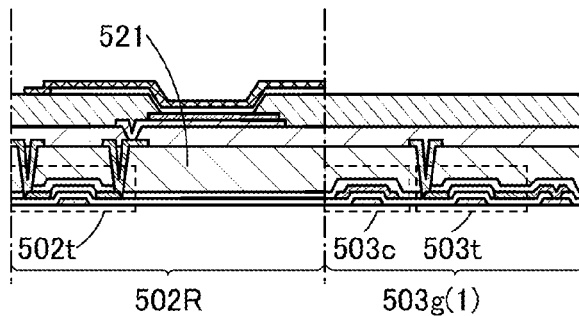
Figure 13C:
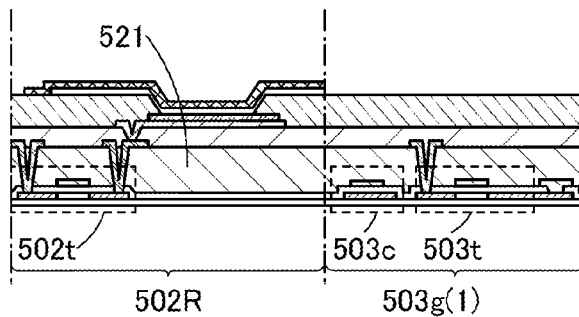

FIGS. 13A to 13C are cross-sectional views of the touch panel 500 taken along line X1-X2 in FIG. 12A.

The touch panel 500 includes a display portion 501 and a touch sensor 595 (see FIG. 12B). Further, the touch panel 500 includes a substrate 510, a substrate 570, and a substrate 590. Note that the substrate 510, the substrate 570, and the substrate 590 each have flexibility.

The display portion 501 includes the substrate 510 and a plurality of wirings 511. Note that the plurality of wirings 511 have a function of supplying signals to a plurality of pixels over the substrate 510. The plurality of wirings 511 is led to a peripheral portion of the substrate 510, and part of the plurality of wirings 511 forms a terminal 519. The terminal 519 is electrically connected to an FPC 509(1).

The substrate 590 includes the touch sensor 595 and a plurality of wirings 598 electrically connected to the touch sensor 595. The plurality of wirings 598 is led to a peripheral portion of the substrate 590, and part of the plurality of wirings 598 forms a terminal. The terminal is electrically connected to an FPC 509(2). Note that in FIG. 12B, electrodes, wirings, and the like of the touch sensor 595 provided on the back side of the substrate 590 (the side facing the substrate 510) are indicated by solid lines for clarity.

As the touch sensor 595, for example, a capacitive touch sensor can be used. Examples of the capacitive touch sensor are a surface capacitive touch sensor and a projected capacitive touch sensor. Examples of the projected capacitive touch sensor include a self-capacitive touch sensor and a mutual capacitive touch sensor, which differ mainly in the driving method. The use of a mutual capacitive touch sensor is preferable because multiple points can be sensed simultaneously.

An example of using a projected capacitive touch sensor is described below with reference to FIG. 12B. Note that a variety of sensors that can sense the closeness or the contact of a sensing target such as a finger, can be used.

The projected capacitive touch sensor 595 includes electrode 591 and electrode 592. The electrode 591 is electrically connected to any of the plurality of wirings 598, and the electrode 592 is electrically connected to any of the other wirings 598.

The electrode 592 has a shape of a plurality of quadrangles arranged in one direction with one corner of a quadrangle connected to one corner of another quadrangle as illustrated in FIGS. 12A and 12B. The electrodes 591 each have a quadrangular shape and are arranged in a direction intersecting with the direction in which the electrode 592 extend. A wiring 594 electrically connects two electrodes 591 between which the electrode 592 is positioned. The intersecting area of the electrode 592 and the wiring 594 is preferably as small as possible. Such a structure allows a reduction in the area of a region where the electrodes are not provided, reducing unevenness in transmittance. As a result, unevenness in luminance of light from the touch sensor 595 can be reduced.

Note that the shapes of the electrodes 591 and the electrodes 592 are not limited to the above-mentioned shapes and can be any of a variety of shapes. For example, the plurality of electrodes 591 may be provided so that space between the electrodes 591 are reduced as much as possible, and a plurality of electrodes 592 may be provided with an insulating layer sandwiched between the electrodes 591 and the electrodes 592 and may be spaced apart from each other to form a region not overlapping with the electrodes 591. In that case, between two adjacent electrodes 592, it is preferable to provide a dummy electrode which is electrically insulated from these electrodes, whereby the area of a region having a different transmittance can be reduced.

The structure of the touch sensor 595 is described with reference to FIG. 13A. The touch sensor 595 includes the substrate 590, the electrodes 591 and the electrodes 592 alternately provided on the substrate 590, an insulating layer 593 covering the electrodes 591 and the electrodes 592, and the wiring 594 that electrically connects the adjacent electrodes 591 to each other. Furthermore, the touch panel 500 includes a resin layer 597 for attaching the substrate 590 to the substrate 570 so that the touch sensor 595 overlaps with the display portion 501.

The electrodes 591 and the electrodes 592 are formed using a light-transmitting conductor. As a light-transmitting conductor, a conductive oxide such as indium oxide, indium tin oxide, indium zinc oxide, zinc oxide, or zinc oxide to which aluminum is added, or zinc oxide to which gallium is added can be used. Note that a film including graphene may be used as well. The film including graphene can be formed, for example, by reducing a film containing graphene oxide. As a reducing method, a method with application of heat or the like can be employed.

The electrodes 591 and the electrodes 592 may be formed by depositing a light-transmitting conductor on the substrate 590 by a sputtering method and then removing an unnecessary portion by any of various patterning techniques such as photolithography.

For the insulating layer 593, for example, an organic resin such as acrylic or epoxy, an inorganic resin having a siloxane bond, and an inorganic insulator such as silicon oxide, silicon oxynitride, or aluminum oxide can be used.

Openings reaching the electrodes 591 are formed in the insulating layer 593, and the wiring 594 electrically connects the adjacent electrodes 591. A light-transmitting conductor can be favorably used as the wiring 594 because the aperture ratio of the touch panel can be increased. Moreover, a conductor with higher conductivity than the conductivities of the electrodes 591 and 592 can be favorably used as the wiring 594 because electric resistance can be reduced.

One electrode 592 extends in one direction, and the plurality of electrodes 592 are provided in the form of stripes.

The wiring 594 intersects with the electrode 592.

Adjacent electrodes 591 are provided with one electrode 592 provided therebetween. The wiring 594 electrically connects the adjacent electrodes 591.

Note that the plurality of electrodes 591 are not necessarily arranged in the direction orthogonal to one electrode 592 and may be arranged to intersect with one electrode 592 at an angle of less than 90 degrees.

One wiring 598 is electrically connected to any of the electrodes 591 and 592. Part of the wiring 598 serves as a terminal. For the wiring 598, a metal such as aluminum, gold, platinum, silver, nickel, titanium, tungsten, chromium, molybdenum, iron, cobalt, copper, or palladium or an alloy containing any of these metals can be used.

Note that an insulating layer that covers the insulating layer 593 and the wiring 594 may be provided to protect the touch sensor 595.

Furthermore, a connection layer 599 electrically connects the wiring 598 to the FPC 509(2).

As the connection layer 599, any of various anisotropic conductive films (ACF), anisotropic conductive pastes (ACP), and the like can be used.

The resin layer 597 has a light-transmitting property. For example, a thermosetting resin or an ultraviolet curable resin can be used; specifically, a resin such as an acrylic resin, a urethane resin, an epoxy resin, or a resin having a siloxane bond can be used.

The display portion 501 includes a plurality of pixels arranged in a matrix. Each of the pixels includes a display element and a pixel circuit for driving the display element.

In this embodiment, an example of using an organic electroluminescent element that emits white light as a display element is described; however, the display element is not limited to such element.

For example, organic electroluminescent elements that emit light of different colors may be included in sub-pixels so that the light of different colors can be emitted from the respective sub-pixels.

Other than organic electroluminescent elements, any of various display elements such as display elements (electronic ink) that perform display by an electrophoretic method, an electrowetting method, or the like; MEMS shutter display elements; optical interference type MEMS display elements; and liquid crystal elements can be used.

Furthermore, this embodiment can be used in a transmissive liquid crystal display, a transflective liquid crystal display, a reflective liquid crystal display, a direct-view liquid crystal display, or the like. In the case of a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption. A structure suitable for employed display elements can be selected from among a variety of structures of pixel circuits.

In the display portion, an active matrix method in which an active element is included in a pixel or a passive matrix method in which an active element is not included in a pixel can be used.

In an active matrix method, as an active element (a non-linear element), not only a transistor but also various active elements (non-linear elements) can be used. For example, a metal insulator metal (MIM), a thin film diode (TFD), or the like can also be used. Since such an element has few number of manufacturing steps, manufacturing cost can be reduced or yield can be improved. Alternatively, since the size of the element is small, the aperture ratio can be improved, so that power consumption can be reduced or higher luminance can be achieved.

As a method other than the active matrix method, the passive matrix method in which an active element (a non-linear element) is not used can also be used. Since an active element (a non-linear element) is not used, the number of manufacturing steps is small, so that manufacturing cost can be reduced or the yield can be improved. Alternatively, since an active element (a non-linear element) is not used, the aperture ratio can be improved, so that power consumption can be reduced or higher luminance can be achieved, for example.

As the substrate 510 and the substrate 570, a flexible substrate is preferably used. Further, as the substrate 510 and the substrate 570, it is preferable to use a substrate with which passage of impurities is inhibited. For example, it is preferable to use a substrate with a water vapor transmission rate of $10^{-5}$ [g/m$^2$·day] or less, preferably $10^{-6}$ [g/m$^2$·day] or less. Note that the substrate 510 and the substrate 570 preferably have a coefficient of linear expansion substantially equal to each other. For example, the coefficient of linear expansion of the substrates is preferably lower than or equal to $1\times10^{-1}$/K, further preferably lower than or equal to $5\times10^{-5}$/K, and still further preferably lower than or equal to $1\times10^{-5}$/K.

For example, the substrate 510 is a stack body in which a flexible substrate 510b, a barrier film 510a that prevents diffusion of impurities to light-emitting elements, and a resin layer 510c that attaches the barrier film 510a to the substrate 510b are stacked. For example, polyester, polyolefin, polyamide (e.g., nylon, aramid), polyimide, polycarbonate, or a resin having an acrylic bond, a urethane bond, an epoxy bond, or a siloxane bond can be used for the resin layer 510c. The substrate 570 is a stack body in which a flexible substrate 570b, a barrier film 570a that prevents diffusion of impurities to the light-emitting elements, and a resin layer 570c that attaches the barrier film 570a to the substrate 570b are stacked.

A sealant 560 attaches the substrate 570 to the substrate 510. The sealant 560 has higher refractive index than the air. Furthermore, in the case of extracting light to the sealant 560 side, it may be preferable that the sealant 560 have higher refractive index than the air because total reflection of light at an interface or the like between the sealant 560 and another layer can be reduced. The pixel circuits and the light-emitting elements (e.g., a light-emitting element 550R) are provided between the substrate 510 and the substrate 570.

A pixel includes a sub-pixel 502R, and the sub-pixel 502R includes a light-emitting module 580R.

The sub-pixel 502R includes the light-emitting element 550R and the pixel circuit that can supply electric power to the light-emitting element 550R and includes the transistor 502t. Furthermore, the light-emitting module 580R includes the light-emitting element 550R and an optical element (e.g., a coloring layer 567R). Note that the light-emitting element 550R includes a lower electrode, an upper electrode, and a layer containing a light-emitting organic compound between the lower electrode and the upper electrode.

The light-emitting module 580R includes the coloring layer 567R on the light extraction side. The coloring layer transmits light of a particular wavelength and is, for example, a layer that selectively transmits light of red, green, or blue color. Note that in another sub-pixel, a region that transmits light emitted from the light-emitting element as it is may be provided as well. In the case where the sealant 560 is provided on the light extraction side, the sealant 560 has a region in contact with the light-emitting element 550R and the coloring layer 567R. The coloring layer 567R is positioned in a region overlapping with the light-emitting element 550R. Accordingly, part of light emitted from the light-emitting element 550R passes through the coloring layer 567R and is emitted to the outside of the light-emitting module 580R as indicated by an arrow in FIG. 13A.

The display portion 501 includes a light-blocking layer 567BM on the light extraction side. The light-blocking layer 567BM is provided so as to surround the coloring layer (e.g., the coloring layer 567R).

The display portion 501 includes an anti-reflective layer 567p positioned in a region overlapping with pixels. As the anti-reflective layer 567p, a circular polarizing plate can be used, for example. The display portion 501 includes an insulator 521. Note that the insulator 521 covers the transistor 502t. Further, the insulator 521 can be used as a layer for planarizing unevenness caused by the pixel circuits. A stacked film including a layer that can prevent diffusion of impurities can be used as the insulator 521. This can prevent the reliability of the transistor 502t or the like from being lowered by diffusion of impurities.

The display portion 501 includes the light-emitting elements (e.g., the light-emitting element 550R) over the insulator 521. The display portion 501 includes, over the insulator 521, a partition wall 528 that overlaps with an end portion of the lower electrode. In addition, a spacer that controls the distance between the substrate 510 and the substrate 570 is provided on the partition wall 528.

A scan line driver circuit 503g(1) includes a transistor 503t and a capacitor 503c. Note that the driver circuit can be formed in the same process and over the same substrate as those of the pixel circuits.

The display portion 501 includes the wiring 511 through which signals can be supplied. Further, part of the wiring 511 forms the terminal 519. Note that the FPC 509(1) through which a signal such as an image signal or a synchronization signal can be supplied is electrically connected to the terminal 519. Note that a printed wiring board (PWB) may be attached to the FPC 509(1).

Specifically, a metal element selected from aluminum, chromium, copper, tantalum, titanium, molybdenum, tungsten, nickel, yttrium, zirconium, silver, and manganese; an alloy including any of the above-described metal elements; an alloy including any of the above-described metal elements in combination; or the like can be used. In particular, one or more elements selected from aluminum, chromium, copper, tantalum, titanium, molybdenum, and tungsten are preferably included. In particular, an alloy of copper and manganese is suitably used in microfabrication with the use of a wet etching method. For example, a two-layer structure in which titanium is stacked over aluminum, a two-layer structure in which titanium is stacked over titanium nitride, a two-layer structure in which tungsten is stacked over titanium nitride, a two-layer structure in which tungsten is stacked over tantalum nitride or tungsten nitride, a three-layer structure in which titanium, aluminum, and titanium are stacked in this order, or the like can be used. Specifically, a stacked structure in which an alloy or a nitride containing one or more elements selected from titanium, tantalum, tungsten, molybdenum, chromium, neodymium, and scandium is stacked over aluminum can be used. Alternatively, a light-transmitting conductor containing indium oxide, tin oxide, or zinc oxide may be used.

Any of various kinds of transistors can be used in the display portion 501.

A structure in which bottom-gate transistors are used in the display portion 501 is illustrated in FIGS. 13A and 13B. For example, a semiconductor containing an oxide semiconductor, an organic semiconductor, amorphous silicon or the like may be used in the transistor 502t and the transistor 503t illustrated in FIG. 13A. For an oxide semiconductor, for example, an oxide containing one or more of indium, gallium, and zinc may be used. Alternatively, a semiconductor containing polycrystalline silicon that is obtained by crystallization process with laser light or the like can be used in the transistor 502t and the transistor 503t illustrated in FIG. 13B.

A structure in the case of using top-gate transistors in the display portion 501 is illustrated in FIG. 13C. For example, a semiconductor containing polycrystalline silicon, single crystal silicon that is transferred from a single crystal silicon substrate, or the like can be used in the transistor 502t and the transistor 503t illustrated in FIG. 13C.

⟨Touch Panel 2⟩

Another structure of a touch panel of one embodiment of the present invention is described below with reference to FIGS. 14A to 14C.

Figure 14A:
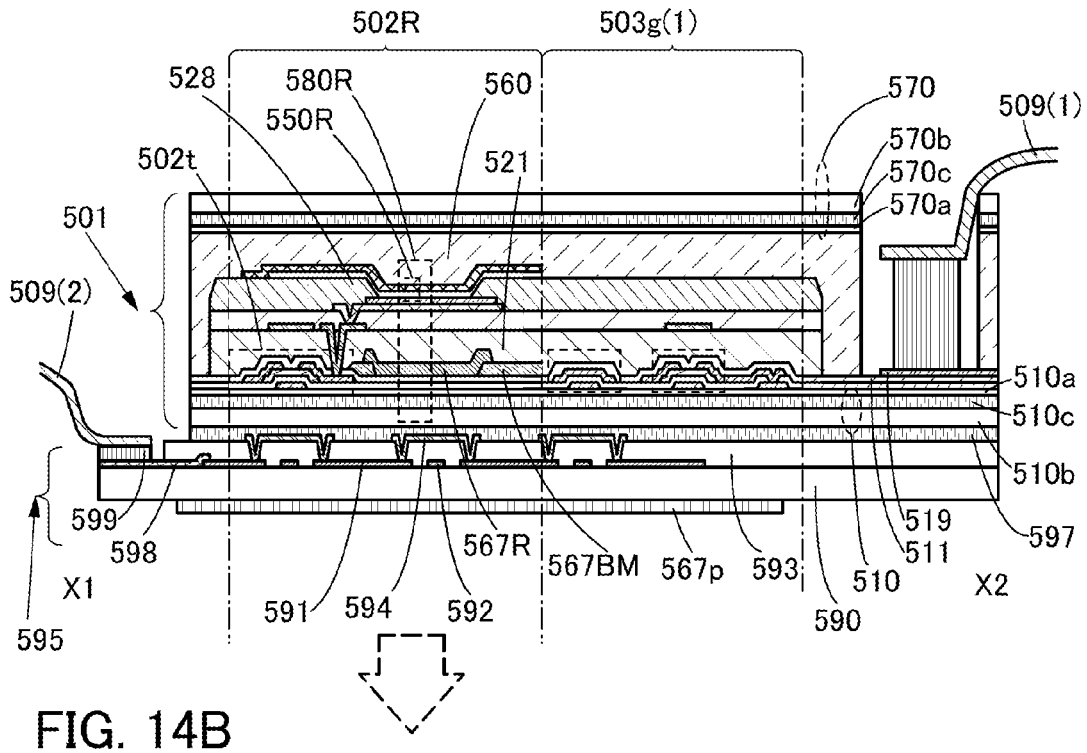
FIGS. 14A to 14C are views illustrating a touch panel.
Figure 14B:
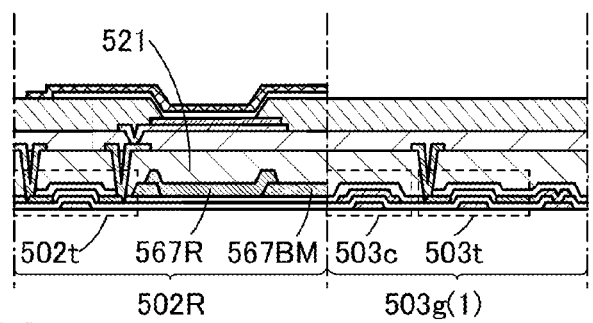
Figure 14C:
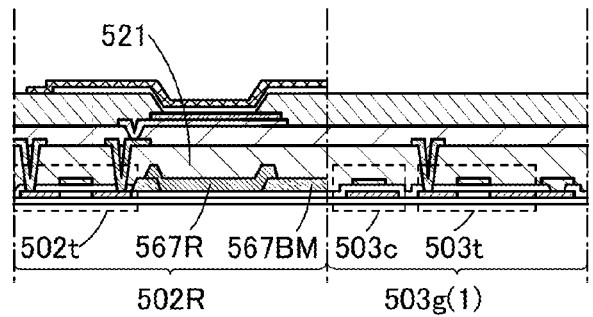

FIGS. 14A to 14C are cross-sectional views of a touch panel 500B. The touch panel 500B is different from the touch panel 500 illustrated in FIGS. 12A and 12B, FIGS. 13A to 13C, and the like in that the display portion 501 displays received image data on the side where the transistors are provided and that the touch sensor is provided on the substrate 510 side of the display portion. Here, different structures are described in detail, and the above description is referred to for the other similar structures.

The display portion 501 includes a plurality of pixels arranged in a matrix. Each of the pixels includes a display element and a pixel circuit for driving the display element.

A pixel includes the sub-pixel 502R, and the sub-pixel 502R includes the light-emitting module 580R. The sub-pixel 502R includes the light-emitting element 550R and the pixel circuit that can supply electric power to the light-emitting element 550R and includes the transistor 502t. The light-emitting module 580R includes the light-emitting element 550R and an optical element (e.g., the coloring layer 567R). The light-emitting element 550R includes a lower electrode, an upper electrode, and a layer containing a light-emitting organic compound between the lower electrode and the upper electrode.

The light-emitting module 580R includes the coloring layer 567R on the light extraction side. The coloring layer transmits light of a particular wavelength and is, for example, a layer that selectively transmits light of red, green, or blue color. Note that in another sub-pixel, a region that transmits light emitted from the light-emitting element as it is may be provided as well.

The coloring layer 567R is positioned in a region overlapping with the light-emitting element 550R. The light-emitting element 550R illustrated in FIG. 14A emits light to the side where the transistor 502t is provided. Accordingly, part of light emitted from the light-emitting element 550R passes through the coloring layer 567R and is emitted to the outside of the light-emitting module 580R as indicated by an arrow in FIG. 14A.

The display portion 501 includes the light-blocking layer 567BM on the light extraction side. The light-blocking layer 567BM is provided so as to surround the coloring layer (e.g., the coloring layer 567R). The display portion 501 includes the insulator 521. Note that the insulator 521 covers the transistor 502t. Further, the insulator 521 can be used as a layer for planarizing unevenness caused by the pixel circuits. A stacked film including a layer that can prevent diffusion of impurities can be used as the insulator 521. This can prevent the decrease of the reliability of the transistor 502t or the like due to diffusion of impurities from the coloring layer 567R.

The touch sensor 595 is provided on the substrate 510 side of the display portion 501 (see FIG. 14A).

The resin layer 597 is provided between the substrate 510 and the substrate 590 and attaches the touch sensor 595 to the display portion 501.

Any of various kinds of transistors can be used in the display portion 501.

A structure in which bottom-gate transistors are used in the display portion 501 is illustrated in FIGS. 14A and 14B. For example, a semiconductor containing an oxide semiconductor, amorphous silicon, or the like can be used in the transistor 502t and the transistor 503t illustrated in FIG. 14A. In the transistors, a channel formation region may be sandwiched between upper and lower gate electrodes, in which case variations in characteristics of the transistors can be prevented and thus the reliability can be increased. For example, a semiconductor containing polycrystalline silicon or the like may be used in the transistor 502t and the transistor 503t illustrated in FIG. 14B.

A structure in which top-gate transistors are used in the display portion 501 is illustrated in FIG. 14C. For example, a semiconductor containing polycrystalline silicon, a transferred single crystal silicon, or the like may be used in the transistor 502t and the transistor 503t in FIG. 14C.

⟨Touch Panel 3⟩

Another structure of a touch panel of one embodiment of the present invention is described below with reference to FIG. 15 and FIGS. 16A to 16C.

Figure 15:
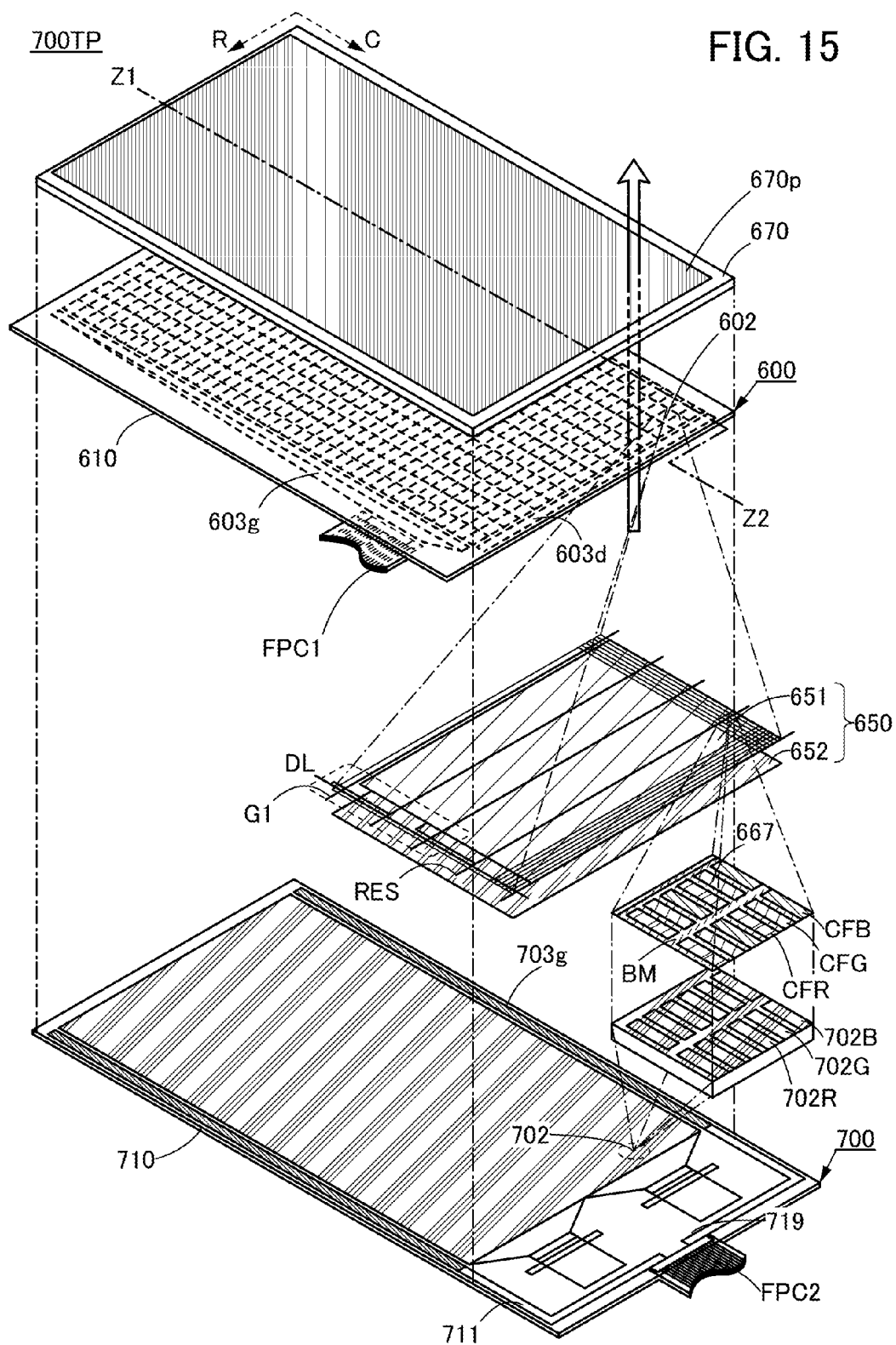
FIG. 15 is a view illustrating a touch panel.

FIG. 15 is a projection view illustrating a structure of a touch panel 700TP of one embodiment of the present invention. Note that for convenience of explanation, part of a sensor unit 602 and part of a pixel 702 are enlarged.

Figure 16A:
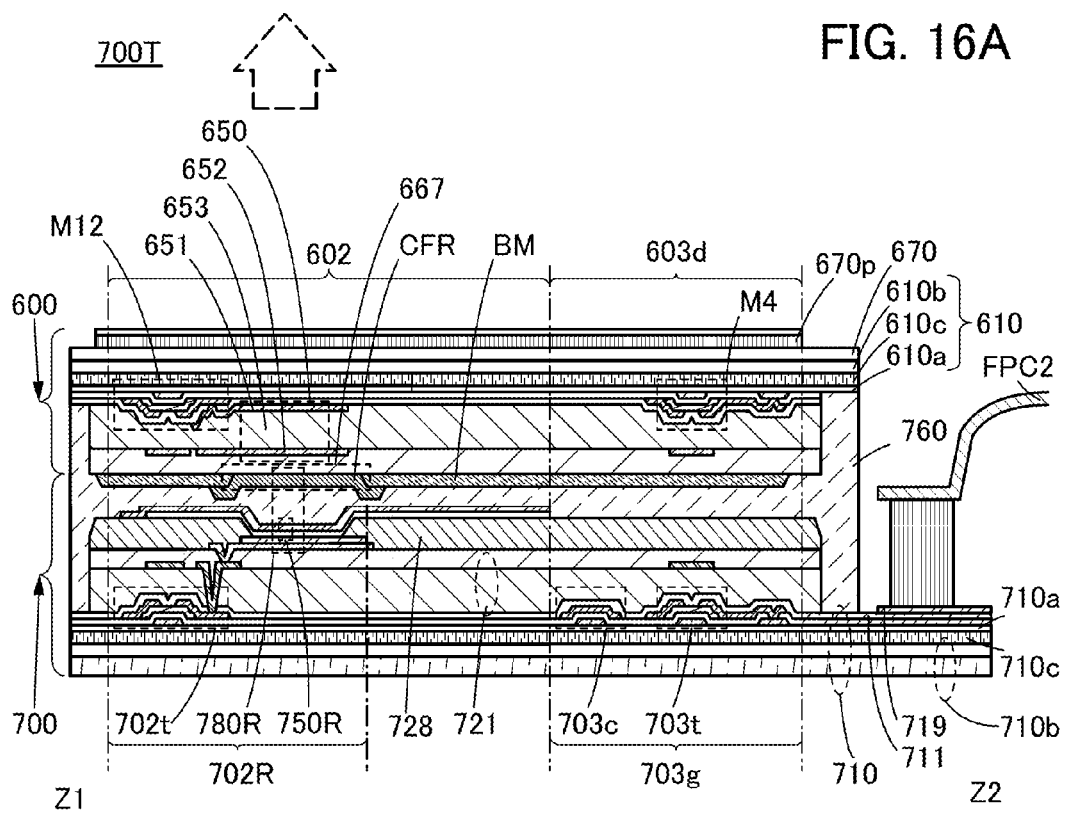
FIGS. 16A to 16C are views illustrating a touch panel.
Figure 16B:
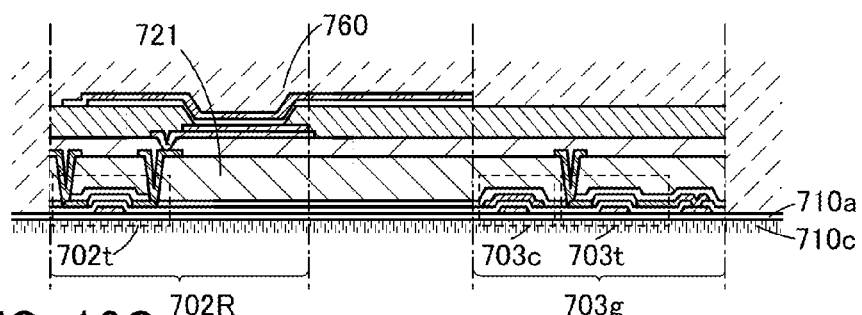
Figure 16C:
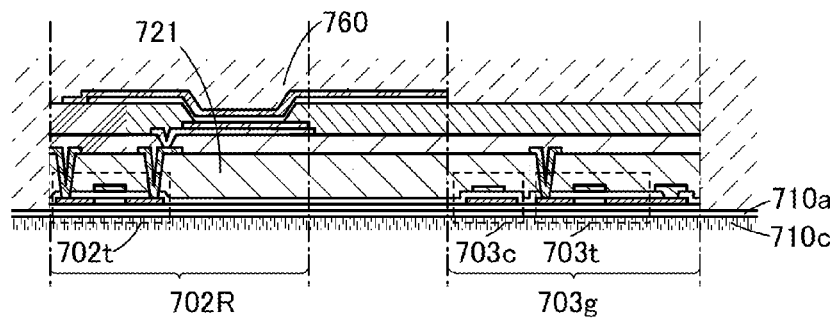

FIG. 16A is a cross-sectional view illustrating a cross-sectional structure of the touch panel 700TP of one embodiment of the present invention along the line Z1-Z2 in FIG. 15. FIGS. 16B and 16C are each a cross-sectional view illustrating a modification example in which part of the structure in FIG. 16A is replaced.

The touch panel 700TP includes a display portion 700 and an input portion 600 overlapping with the display portion 700 (see FIG. 15). The input portion 600 includes a plurality of sensor units 602 arranged in a matrix. Furthermore, the input portion 600 includes a selection signal line G1, a control line RES, and the like each of which is electrically connected to the plurality of sensor units 602 arranged in a row direction (denoted by an arrow R in the figure). In addition, the input portion 600 includes a signal line DL and the like each of which is electrically connected to the plurality of sensor units 602 arranged in a column direction (denoted by an arrow C in the figure). Note that the sensor unit 602 includes a sensor circuit. The sensor circuit is electrically connected to the selection signal line G1, the control line RES, the signal line DL, and the like.

For the sensor circuit, a transistor and/or a sensor element can be used, for example. As a sensor element, for example, a conductor and a capacitor electrically connected to the conductor can be used. Further, a capacitor and a transistor electrically connected to the capacitor can be used.

A capacitor 650 including an insulating layer 653, and a first electrode 651 and a second electrode 652 between which the insulating layer 653 is sandwiched can be used (see FIG. 16A).

Furthermore, the sensor unit includes a plurality of window portions 667 arranged in a matrix. The window portions 667 may transmit visible light and a light-blocking layer BM may be provided between the plurality of window portions 667. In addition, the sensor unit includes coloring layers so as to overlap with the window portions 667. The coloring layer transmits light of a predetermined color. Note that the coloring layer can also be called a color filter. For example, a coloring layer CFB transmitting blue light, a coloring layer CFG transmitting green light, or a coloring layer CFR transmitting red light can be used. Furthermore, a coloring layer transmitting yellow light or a coloring layer transmitting white light may be used.

The display portion 700 includes the plurality of pixels 702 arranged in a matrix. The pixels 702 are arranged so as to overlap with the window portions 667 of the input portion 600.

The pixels 702 may be provided with higher density than the sensor units 602.

The touch panel 700TP includes the window portions 667 which transmit visible light, the input portion 600 including the plurality of sensor units 602 arranged in a matrix, the display portion 700 including the plurality of pixels 702 overlapping with the window portions 667, and the coloring layers provided between the window portions 667 and the pixels 702. Furthermore, each sensor unit is provided with a switch which can reduce interference in another sensor unit.

Thus, a sensing signal sensed by each sensor unit can be supplied as sensing data together with positional data of each sensor unit. Furthermore, sensing data associated with positional data of a pixel for displaying an image can be supplied. Furthermore, when the signal line and the sensor unit which does not supply sensing data are turned off, interference in the sensor unit which supplies sensing data can be reduced. As a result, a novel touch panel 700TP with high convenience or high reliability can be provided.

For example, the input portion 600 of the touch panel 700TP can sense sensing data and supply the sensing data together with positional data. Specifically, a user of the touch panel 700TP can make various gestures (e.g., tap, drag, swipe, and pinch in) using a finger or the like touching the input portion 600 as a pointer.

The input portion 600 can sense a finger or the like which is located close to or in contact with the input portion 600 and supply sensing data including the sensed position, track, and the like.

An arithmetic device determines whether or not the supplied data satisfies predetermined conditions on the basis of a program or the like and executes instructions associated with a predetermined gesture. Thus, a user of the input portion 600 supplies a predetermined gesture using a finger or the like and can make the arithmetic device execute instructions associated with the predetermined gesture.

For example, the input portion 600 of the touch panel 700TP can select one sensor unit from the plurality of sensor units which can supply sensing data to one signal line and make the one signal line and the other sensor units other than the selected sensor unit turn off. Thus, interference in the selected sensor unit, which is caused by the non-selected sensor units, can be reduced. Specifically, interference in the sensor element of the selected sensor unit, which is caused by the sensor elements of the non-selected sensor units, can be reduced.

For example, in the case of using, as a sensor element, a capacitor and a conductor electrically connected to one electrode of the capacitor, it is possible to reduce interference in potential of the conductor in the selected sensor unit, which is caused by potential of the conductors in the non-selected sensor units.

Thus, the touch panel 700TP can drive the sensor unit and supply the sensing data without depending on the size of the touch panel 700TP. For example, the touch panel 700TP with various sizes can be a touch panel of various sizes, for example, a hand-held touch panel or a touch panel that can be used in a white board.

Furthermore, the touch panel 700TP can be folded and unfolded. In addition, even in the case where interference in the selected sensor unit, which is caused by the non-selected sensor unit, is different between the touch panel 700TP in the folded state and the touch panel 700TP in the unfolded state, the touch panel 700TP can drive the sensor unit and supply the sensing data without depending on the state of the touch panel 700TP.

Furthermore, display data V can be supplied to the display portion 700 of the touch panel 700TP. For example, the arithmetic device can supply the display data V.

In addition to the above-described structure, the touch panel 700TP can also employ the following structure.

The input portion 600 of the touch panel 700TP may include a driver circuit 603g or a driver circuit 603d. The input portion 600 of the touch panel 700TP may be electrically connected to a flexible printed circuit FPC1. The display portion 700 of the touch panel 700TP may include a scan line driver circuit 703g, a wiring 711, or a terminal 719. The display portion 700 of the touch panel 700TP may be electrically connected to a flexible printed circuit FPC2.

Further, a protection layer 670 which prevents damage and protects the touch panel 700TP may be included. For example, a ceramic coat layer or a hard coat layer can be used as the protection layer 670. Specifically, a layer containing aluminum oxide or an UV curable resin can be used. Further, an anti-reflective layer 670p which that weakens the intensity of external light reflected by the touch panel 700TP can be used. Specifically, a circularly polarizing plate can be used.

Components of the touch panel 700TP are described below. Note that these components cannot be clearly distinguished and one component also serves as another component or includes part of another component in some cases.

For example, the input portion 600 including the coloring layers overlapping with the plurality of window portions 667 also serves as a color filter.

Furthermore, for example, the touch panel 700 in which the input portion 600 overlaps the display portion 700 serves as the input portion 600 as well as the display portion 700.

The touch panel 700TP includes the input portion 600 and the display portion 700.

The input portion 600 includes the sensor unit 602, the selection signal line G1, the signal line DL, and a base material 610. Note that the input portion 600 may be formed in such a manner that a film for forming the input portion 600 is deposited over the base material 610 and processed. Alternatively, the input portion 600 may be formed in such a manner that part of the input portion 600 is formed over another base material and transferred to the base material 610.

The sensor unit 602 senses an object which is located close to or in contact with the sensor unit 602 and supplies sensing data. For example, the sensor unit 602 senses capacitance, illuminance, magnetic force, electric waves, pressure, or the like and supplies data based on the sensed physical quantity. Specifically, a capacitor, a photoelectric conversion element, a magnetic sensing element, a piezoelectric element, a resonator, or the like can be used as the sensing element. Further, the sensor unit 602 senses a change in capacitance between the sensor unit 602 and the object which is located close to or in contact with the sensor unit 602. Specifically, a conductor and a sensor circuit electrically connected to the conductor may be used.

Note that when an object having a dielectric constant higher than that of the air, such as a finger, is located close to a conductor in the air, the capacitance between the finger and the conductor changes. A sensing data can be supplied by sensing this capacitance change. Specifically, a sensor circuit including a conductor and a capacitor one of electrodes of which is connected to the conductor can be used in the sensor unit 602. For example, the change in capacitance causes charge distribution between the capacitor and the capacitance between the finger and the conductor, leading to a change in voltage between both electrodes of the capacitor. A sensing signal which is the voltage change can be used as the sensing data. Specifically, the voltage between the electrodes of the capacitor 650 changes when an object is close to the conductor which is electrically connected to one of the electrodes of the capacitor 650 (see FIG. 16A).

The sensor unit 602 includes a switch which can be turned on or off in accordance with a control signal. For example, a transistor M12 can be used as a switch. A transistor which amplifies a sensing signal can be used for the sensor unit

602. Furthermore, a transistor which can be manufactured through the same process as that of the transistor M12 can be used as a transistor which amplifies a sensing signal and a switch. Accordingly, the input portion 600 can be provided through a simplified manufacturing process. Note that the description of the transistor 502*t* and the like illustrated in FIGS. 13A to 13C and the like is referred to for the transistors.

The input portion 600 includes the selection signal line G1, the control line RES, the signal line DL, and the like.

The driver circuit 603*g* can supply a selection signal at a predetermined timing, for example. Specifically, the driver circuit 603*g* supplies selection signals to the selection signal lines G1 in a predetermined order. Further, any of various circuits can be used as the driver circuit 603*g*. For example, a shift register, a flip flop circuit, a combination circuit, or the like can be used.

The driver circuit 603*d* supplies sensing data on the basis of a sensing signal. Any of various circuits can be used as the driver circuit 603*d*. For example, a circuit which can serve as a source follower circuit or a current mirror circuit by electrical connection with the sensor circuit provided in the sensor unit can be used as the driver circuit 603*d*. Further, an analog/digital converter circuit which converts a sensing signal into a digital signal may be included.

There is no particular limitation on the base material 610 as long as the base material 610 has heat resistance high enough to withstand a manufacturing process and a thickness and a size which can be used in a manufacturing apparatus. When a flexible base material is used for the base material 610, the input portion 600 can be folded or unfolded. Note that in the case where the input portion 600 is provided on a side where the display portion 700 performs display, a light-transmitting base material is used as the base material 610.

For the base material 610, an organic material, an inorganic material, a composite material of an organic material and an inorganic material, or the like can be used. For example, an inorganic material such as glass, a ceramic, or a metal can be used for the base material 610. Specifically, non-alkali glass, soda-lime glass, potash glass, crystal glass, or the like can be used for the base material 610. Specifically, a metal oxide film, a metal nitride film, a metal oxynitride film, or the like can be used for the base material 610. For example, silicon oxide, silicon nitride, silicon oxynitride, an alumina film, or the like can be used for the base material 610. For example, an organic material such as a resin, a resin film, or plastic can be used for the base material 610. Specifically, a resin film or resin plate of polyester, polyolefin, polyamide, polyimide, polycarbonate, an acrylic resin, or the like can be used for the base material 610. For example, a composite material such as a resin film to which a thin glass plate or a film of an inorganic material is attached can be used as the base material 610. For example, a composite material formed by dispersing a fibrous or particulate metal, glass, inorganic material, or the like into a resin film can be used as the base material 610. For example, a composite material formed by dispersing a fibrous or particulate resin, organic material, or the like into an inorganic material can be used as the base material 610.

A single-layer material or a stacked-layer material in which a plurality of layers are stacked can be used for the base material 610. For example, a stacked-layer material including a base material and an insulating layer that prevents diffusion of impurities contained in the base material can be used for the base material 610. Specifically, a stacked-layer material in which glass and one or a plurality of films that prevents diffusion of impurities contained in the glass and that are selected from a silicon oxide film, a silicon nitride film, a silicon oxynitride film, and the like are stacked can be used for the base material 610. Alternatively, a stacked-layer material in which a resin and a film that prevents diffusion of impurities permeating the resin, such as a silicon oxide film, a silicon nitride film, or a silicon oxynitride film are stacked can be used for the base material 610. Specifically, a stack body including a flexible base material 610*b*, a barrier film 610*a* that prevents diffusion of impurities, and a resin layer 610*c* that attaches the base material 610*b* and the barrier film 610*a* can be used (see FIG. 16A).

The flexible printed circuit FPC1 supplies a timing signal, a power supply potential, or the like and is supplied with a sensing signal.

The display portion 700 includes the pixels 702, scan lines, the signal lines, and a base material 710 (see FIG. 15). Note that the display portion 700 may be formed in such a manner that films for forming the display portion 700 are deposited over the base material 710 and the films are processed. Alternatively, the display portion 700 may be formed in such a manner that part of the display portion 700 is formed over another base material and the part is transferred to the base material 710.

The pixel 702 includes a sub-pixel 702B, a sub-pixel 702G, and a sub-pixel 702R, and each sub-pixel includes a display element and a pixel circuit for driving the display element.

The pixel circuit includes a transistor 702*t*, for example.

The display portion 700 includes an insulator 721 covering the transistor 702*t*. The insulator 721 can be used as a layer for planarizing unevenness due to the pixel circuit. A stacked film including a layer that can prevent diffusion of impurities can be used as the insulator 721. This can prevent the reliability of the transistor 702*t* or the like from being lowered by diffusion of impurities.

The light-emitting module 780R includes the coloring layer CFR on the light extraction side. The coloring layer transmits light of a particular wavelength and is, for example, a layer that selectively transmits light of red, green, or blue color. Note that other sub-pixels may be provided so as to overlap with the window portions, which are not provided with the coloring layers, so that light from the light-emitting element can be emitted without passing through the coloring layers.

The coloring layer CFR is positioned in a region overlapping with the light-emitting element 750R. Accordingly, part of light emitted from the light-emitting element 750R passes through the coloring layer CFR and is emitted to the outside of the light-emitting module 780R in the direction indicated by an arrow in FIG. 16A.

The light-blocking layer BM is located so as to surround the coloring layer (e.g., the coloring layer CFR).

Note that in the case where a sealant 760 is provided on the light extraction side, the sealant 760 may be in contact with the light-emitting element 750R and the coloring layer CFR.

A lower electrode is provided over the insulator 721. A partition wall 728 which is provided with an opening portion overlapping with the lower electrode is included. Note that part of the partition wall 728 overlaps with an end portion of the lower electrode. A layer containing a light-emitting organic compound is held between the lower electrode and the upper electrode, so that a light-emitting element (e.g., the light-emitting element 750R) is formed. The pixel circuit supplies electric power to the light-emitting element.

In addition, a spacer that controls a gap between the base material 610 and the base material 710 is provided over the partition wall 728.

In the case of a transflective liquid crystal display or a reflective liquid crystal display, some of or all of pixel electrodes function as reflective electrodes. For example, some or all of pixel electrodes are formed to contain aluminum, silver, or the like. Furthermore, a memory circuit such as an SRAM can be provided under the reflective electrodes, leading to lower power consumption. A structure suitable for employed display elements can be selected from among a variety of structures of pixel circuits.

A flexible base material can be used as the base material 710. For example, a base material similar to the base material that can be used as the base material 610 can be used as the base material 710. Note that in the case where the base material 710 does not need a light-transmitting property, for example, a non-light-transmitting base material such as SUS or aluminum can be used. For example, a stack body including a flexible base material 710b, a barrier film 710a that prevents diffusion of impurities, and a resin layer 710c that attaches the barrier film 710a and the base material 710b can be favorably used for the base material 710 (see FIG. 16A).

The sealant 760 attaches the base material 610 and the base material 710. The sealant 760 has a refractive index higher than that of the air. Furthermore, in the case of extracting light to the sealant 760 side, it may be preferable that the sealant 760 have higher refractive index than the air because total reflection of light at an interface or the like between the sealant 760 and another layer can be reduced. The pixel circuits and the light-emitting elements (e.g., the light-emitting element 750R) are provided between the base material 710 and the base material 610.

The scan line driver circuit 703g supplies a selection signal. The scan line driver circuit 703g includes a transistor 703t and a capacitor 703c. Note that a transistor which can be formed in the same process and over the same base material as those of the pixel circuit can be used in the driver circuit.

The display portion 700 includes wirings such as scan lines, signal lines, and power supply lines.

<Application Example>

The above-described input device can be used for an application to an operating device or the like.

Figure 10:
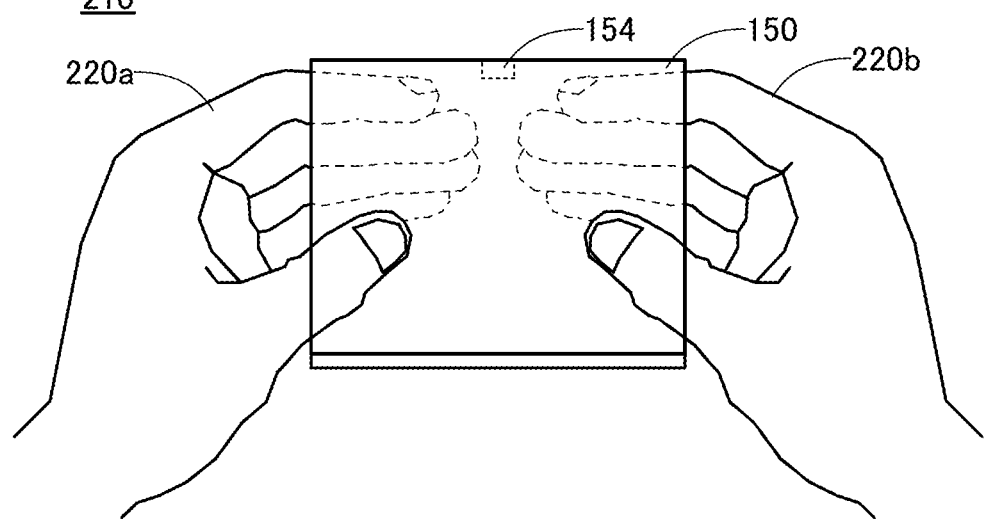
FIG. 10 is a perspective view illustrating a game machine.

FIG. 10 illustrates an example of an operating device 210 including the input device 150 and a transmitting portion 154. Note that the operating device includes a controller, a remote controller, a game controller, and the like in its category. The operating device 210 does not necessarily include the transmitting portion 154.

The transmitting portion 154 has a function of transmitting a signal input to the input device 150 of the operating device 210. For example, the transmitting portion 154 can transmit a signal to a receiver (not illustrated) by radio or the like. Note that a signal may be transmitted through a wire.

For example, as illustrated in FIG. 10, the operating device 210 can be held with a left hand 220a and a right hand 220b. A signal can be output from the input device 150 by the above-described method or the like.

Note that the operating device 210 may include a flexible region. The flexible region of the operating device 210 enables a variety of designs of the operating device 210. Further, the lightweight and durable operating device 210 can be achieved.

The operating device 210 may include a display region, a memory device, and a processor. Furthermore, the operating device 210 may be used as a game machine.

Figure 11A:
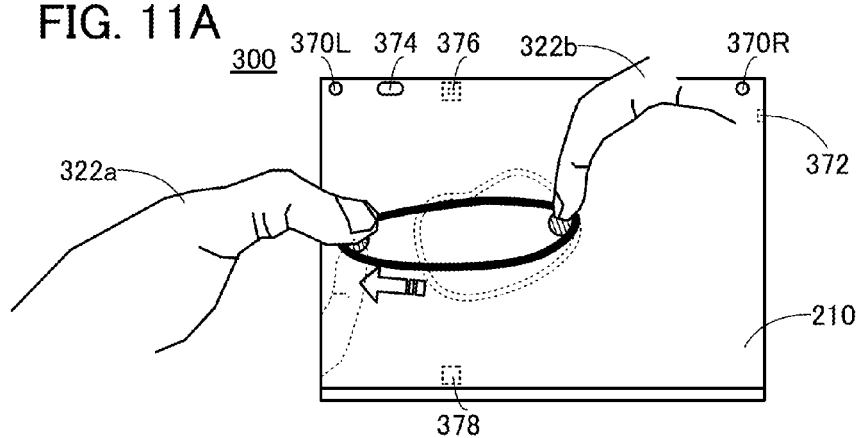
FIGS. 11A to 11C are perspective views each illustrating a game machine.
Figure 11B:
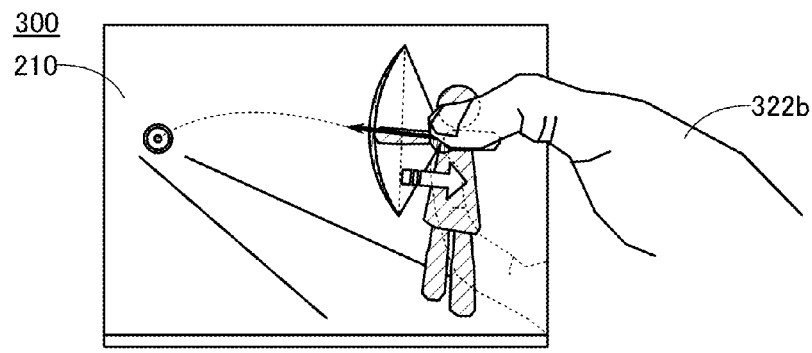
Figure 11C:
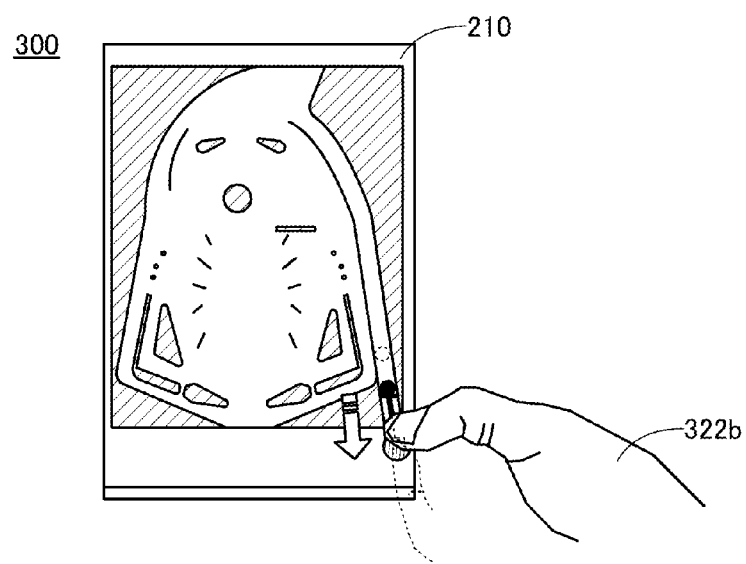

FIGS. 11A to 11C illustrate examples of a game machine 300 including the operating device 210.

FIG. 11A illustrates an example in which a ring-shaped object like a rubber band is extended with the thumb and forefinger of a left hand 322a and the forefinger of a right hand 322b. For example, when the thumb and forefinger of the left hand 322a are disengaged from the object which is extended to its full length, an operation that the object flies while shrinking can be achieved. Note that the game machine 300 illustrated in FIG. 11A or the like may include a speaker 370L, a speaker 370R, an external connection terminal 372, a microphone 374, an antenna 376, and a processor 378.

FIG. 11B illustrates an example in which a bow is shot. When the bow is drawn with the thumb and forefinger of the right hand 322b and the thumb and forefinger of the right hand 322b are disengaged from the bow, an operation that the bow is shot and the like can be achieved.

FIG. 11C illustrates an example of pinball. When a spring is drawn with the thumb and forefinger of the right hand 322b and the thumb and forefinger of the right hand 322b are disengaged from the spring, an operation that a ball flies out and the like can be achieved.

Thus, the use of the operating device of one embodiment of the present invention enables a game machine or the like having unique operability to be provided. Furthermore, the input device of one embodiment of the present invention makes little false sensing, and thus is suitable for a game machine which requires high sensing accuracy.

Note that the input device, the display device, the module, the operating device, and/or the game machine of one embodiment of the present invention may be applied to an electronic device. The electronic device may include a speaker, an operation key, or a battery.

An information device is also included in the category of an electronic device. The portable information devices (portable devices) include, for example, mobile phone devices (e.g., phablets and smartphones), tablet terminals (slate PCs), and electronic paper. For example, when an information device of one embodiment of the present invention is used, in an e-book reader, the Web, or the like, an operation that a page is turned or returned can be performed without the use of the thumb by the sensing method illustrated in FIGS. 5A to 5D. That is, the thumb can be used only for holding the information device. Further, lock release by sensing on an unexposed surface on return from a sleep mode or the like leads to easy and safe operation return.

Furthermore, a clock, a wristwatch, a bracelet, an anklet, a pendant, glasses (for both eyes and for one eye), a ring, a card, and the like, each including the input device, the display device, the module, the operating device, and/or a game machine of one embodiment of the present invention are also included in the category of the electronic device of one embodiment of the present invention.

This application is based on Japanese Patent Application serial no. 2014-095070 filed with Japan Patent Office on May 2, 2014, the entire contents of which are hereby incorporated by reference.

What is claimed is:

1. A driving method of an input device comprising:
a first region and a second region, wherein the first region and the second region are provided so as to face each other, the driving method comprising steps of:
  obtaining first positional data input to the first region;
  obtaining second positional data input to the second region;
  converting the second positional data into third positional data comprising data in which the second positional data is inverted vertically or horizontally;
  obtaining fourth positional data comprising data which is logical conjunction of the first positional data and the third positional data; and
  outputting a signal in accordance with the fourth positional data.

2. The driving method of the input device according to claim 1, wherein the signal comprises labeled pattern data.

3. The driving method of the input device according to claim 1, wherein the input device has a function of sensing contact of an object.

4. The driving method of the input device according to claim 1, wherein the input device comprises a flexible region.

5. A driving method of an input device comprising:
  a first region and a second region, wherein the first region and the second region are provided so as to face each other,
  the driving method comprising steps of:
    obtaining first positional data input to the first region;
    obtaining second positional data input to the second region;
    obtaining third positional data comprising data which is logical conjunction of the first positional data and the second positional data; and
    outputting a signal in accordance with the third positional data.

6. The driving method of the input device according to claim 5, wherein the signal comprises labeled pattern data.

7. The driving method of the input device according to claim 5, wherein the input device has a function of sensing contact of an object.

8. The driving method of the input device according to claim 5, wherein the input device comprises a flexible region.

* * * * *